US012770891B2

(12) United States Patent
Kim et al.

(10) Patent No.: US 12,770,891 B2
(45) Date of Patent: Oct. 20, 2026

(54) PROTECTED COMPONENTS IN ELECTROCHEMICAL DEVICES

(71) Applicants: Robert Bosch GmbH, Stuttgart (DE); Soo Kim, Cambridge, MA (US); Patrick Fayek, Leonberg (DE); Charles Tuffile, Swansea, MA (US)

(72) Inventors: Soo Kim, Cambridge, MA (US); Patrick Fayek, Leonberg (DE); Charles Tuffile, Swansea, MA (US)

(73) Assignee: Robert Bosch GmbH, Stuttgart (DE)

( * ) Notice: Subject to any disclaimer, the term of this patent is extended or adjusted under 35 U.S.C. 154(b) by 658 days.

(21) Appl. No.: 18/037,876

(22) PCT Filed: Nov. 19, 2020

(86) PCT No.: PCT/US2020/061188
§ 371 (c)(1),
(2) Date: May 19, 2023

(87) PCT Pub. No.: WO2022/108584
PCT Pub. Date: May 27, 2022

(65) Prior Publication Data
US 2024/0006620 A1 Jan. 4, 2024

(51) Int. Cl.
*H01M 8/0206* (2016.01)
*H01M 8/0228* (2016.01)

(52) U.S. Cl.
CPC ....... *H01M 8/0206* (2013.01); *H01M 8/0228* (2013.01)

(58) Field of Classification Search
CPC .. H01M 8/0206; H01M 8/0228; H01M 8/021; H01M 8/0208
See application file for complete search history.

(56) References Cited

U.S. PATENT DOCUMENTS

| | | | |
|---|---|---|---|
| 4,686,117 | A | 8/1987 | Arai et al. |
| 6,379,476 | B1 | 4/2002 | Tarutani et al. |
| 7,699,916 | B1 | 4/2010 | Carter et al. |

(Continued)

FOREIGN PATENT DOCUMENTS

| | | | |
|---|---|---|---|
| CN | 205347576 U | * 6/2016 | |
| CN | 109023228 B | 7/2020 | |

(Continued)

OTHER PUBLICATIONS

Jian, L. et al., "Carburisation of interconnect materials in solid oxide fuel cells," Journal of Power Sources, vol. 123, No. 2, 2003, pp. 151-162, DOI: 10.1016/S0378-7753(03)00535-4.

(Continued)

*Primary Examiner* — Imran Akram
(74) *Attorney, Agent, or Firm* — Brooks Kushman P.C.

(57) ABSTRACT

A component of an electrochemical device includes a substrate made of stainless steel, where the substrate is further characterized by a microstructure containing an intermetallic compound. A component of an electrochemical device includes a substrate having at least one surface, where the substrate is made of stainless steel. The component further includes at least one surface coating layer on each of the at least one surface. Each of the at least one surface coating layer includes a carbide material or a MAX phase material.

7 Claims, 4 Drawing Sheets

(56) References Cited

U.S. PATENT DOCUMENTS

| | | | | |
|---|---|---|---|---|
| 8,476,587 | B2 | 7/2013 | Jones et al. | |
| 11,273,526 | B1 * | 3/2022 | Johnson | B23P 6/00 |
| 2003/0116536 | A1 * | 6/2003 | Ohtani | C23C 22/50 216/86 |
| 2009/0226787 | A1 * | 9/2009 | Tanaka | H01M 8/0206 429/523 |
| 2011/0008714 | A1 | 1/2011 | Abd Elhamid et al. | |
| 2011/0033784 | A1 | 2/2011 | Ljungcrantz et al. | |
| 2012/0286152 | A1 * | 11/2012 | Jones | H01J 49/10 427/523 |
| 2014/0202874 | A1 * | 7/2014 | Elgammal | C25B 15/08 205/555 |
| 2017/0298488 | A1 * | 10/2017 | Tarutani | C21D 8/0273 |
| 2018/0083294 | A1 * | 3/2018 | Yano | C25D 7/00 |
| 2019/0003048 | A1 | 1/2019 | Schuster et al. | |
| 2019/0093246 | A1 * | 3/2019 | Reid | C25B 1/135 |

FOREIGN PATENT DOCUMENTS

| | | | | | |
|---|---|---|---|---|---|
| CN | 111384414 | A | | 7/2020 | |
| CN | 115518664 | B | * | 9/2023 | B01J 35/617 |
| EP | 3483967 | A1 | | 5/2019 | |
| JP | 2001357862 | A | * | 12/2001 | |
| JP | 2002151111 | A | * | 5/2002 | |
| JP | 2003193206 | A | * | 7/2003 | |

OTHER PUBLICATIONS

Wang, H.M. et al., "Wear and corrosion behavior of laser clad Cr3Si reinforced intermetallic composite coatings," Intermetallics, vol. 11, No. 8, 2003, pp. 755-762, DOI: 10.1016/S0966-9795(03)00078-5.

Cherigui, M. et al., "FeSi HVOF thermal spray coatings: diagnostic, microstructure, and magnetic properties," Materials Letters, vol. 59, 2005, pp. 463-467, DOI: 10.1016/j.matlet.2004.10.022.

Justus, T. et al., "Fe3Mo3C in situ generated onto sinter-hardening steel by DC plasma technology," Sep. 2017, 2 pages, https://www.researchgate.net/publication/320854578.

Schneeweiss, O. et al., "Fe3Si surface coating on SiFe steel," Journal of Magnetism and Magnetic Materials, vol. 215-216, 2000, pp. 115-117, DOI: 10.1016/S0304-8853(00)00089-5.

Zhang, P. et al., "Phase composition, microstructure evolution and wear behavior of Ni—Mn—Si coatings on copper by laser cladding," Surface & Coatings Technology, vol. 332, Sep. 2017, pp. 504-510, DOI: 10.1016/j.surfcoat.2017.08.072.

International Search Report issued in PCT/US2020/061188, dated Aug. 11, 2021, 4 pages.

* cited by examiner

PROTECTED COMPONENTS IN ELECTROCHEMICAL DEVICES

CROSS-REFERENCE TO RELATED APPLICATIONS

This application is the U.S. national phase of PCT Application No. PCT/US2020/061188 filed Nov. 19, 2020, the disclosure of which is incorporated in its entirety by reference herein.

TECHNICAL FIELD

The present disclosure relates to protected components in electrochemical devices, for example, metal components in a fuel cell or electrolyzer system, such as bipolar plates, fuel storage tanks, connecting pipes, or safety valves, protected with anti-corrosion materials against hydrogen-related degradations (e.g. hydrogen embrittlement).

BACKGROUND

Metals have been a widely used material for thousands of years. Various methods have been developed to preserve metals and prevent their corrosion or disintegration into oxides, hydroxides, sulfates, and other salts. Metals in some industrial applications are especially susceptible to corrosion due to aggressive operating environments. A non-limiting example may be metal components of a fuel cell (e.g. bipolar plates). For instance, bipolar plates are required to be not only sufficiency chemically inert to resist degradation in a highly corrosive environment of the fuel cell, but also electrically conducting to facilitate electron transfer for the oxygen reduction reaction of the fuel cell. Finding a material that meets both the requirements of anti-corrosion and electric conduction has been a challenge.

SUMMARY

According to one embodiment, a component of an electrochemical device is disclosed. The component may include a substrate made of stainless steel characterized by a microstructure containing an intermetallic compound.

According to another embodiment, a component of an electrochemical device is disclosed. The component may include a substrate having at least one surface. The substrate may be made of stainless steel. The component may further include at least one surface coating layer on each of the at least one surface. Each of the at least one surface coating layer may include a carbide material. The carbide material is a carbide compound. The carbide compound may be $Ni_6Mo_6C$, $Cr_{21}Mo_2C_6$, $Fe_{23}C_6$, $Ni_2Mo_4C$, $Mn_3Mo_3C$, $Si_3Mo_5C$, $Mn_7C_3$, $Mn_5SiC$, or a combination thereof.

According to yet another embodiment, a component of an electrochemical device is disclosed. The component may include a substrate having at least one surface. The substrate may be made of stainless steel. The component may further include at least one surface coating layer on each of the at least one surface. Each of the at least one surface coating layer may include a MAX phase material. The MAX phase material is a MAX phase compound with a general formula of $M_{n+1}AX_n$, where n=1 to 4, M is an early transition metal, A is an A-group element (e.g. IIIA, IVA, group 13, or group 14 element), and X is either C or N. The MAX phase compound may be $Nb_4AlC_3$, $Ti_4AlN_3$, $Nb_2SnC$, $Ti_3SnC_2$, $Zr_2SC$, $Ti_2SnC$, $Zr_2SnC$, $Nb_2PC$, $Nb_2AlC$, $Ti_3SiC_2$, $Ti_3AlC_2$, $Ti_2SC$, $V_2PC$, or a combination thereof.

DETAILED DESCRIPTION

Figure 1:
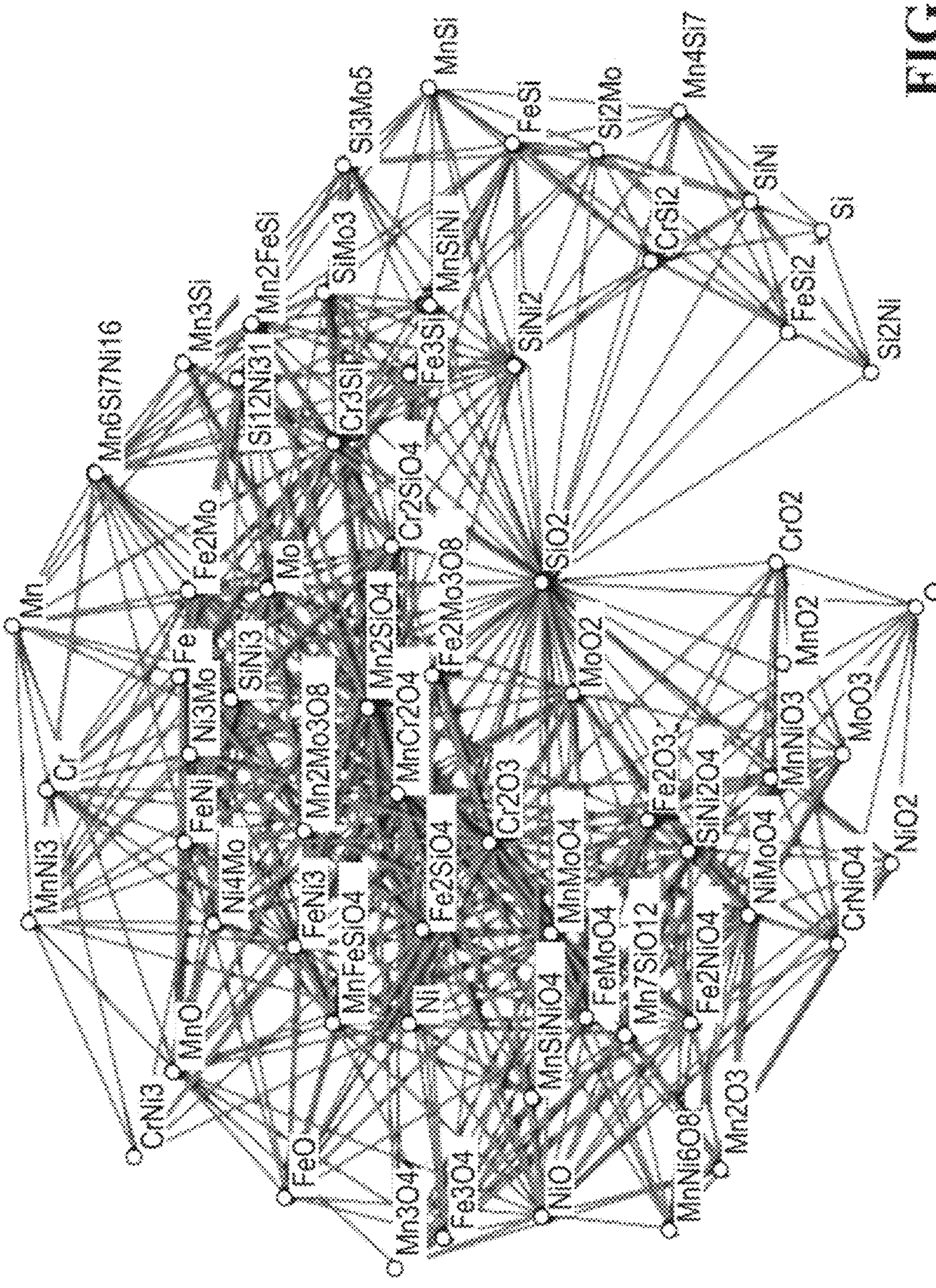
FIG. 1 depicts a chemical space of Fe—Cr—Ni—Mn—Mo—Si—O.

Embodiments of the present disclosure are described herein. It is to be understood, however, that the disclosed embodiments are merely examples and other embodiments can take various and alternative forms. The figures are not necessarily to scale; some features could be exaggerated or minimized to show details of components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for applications or implementations.

This present disclosure is not limited to the specific embodiments and methods described below, as specific components and/or conditions may, of course, vary. Furthermore, the terminology used herein is used only for the purpose of describing embodiments of the present disclosure and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

The description of a group or class of materials as suitable for a given purpose in connection with one or more embodiments implies that mixtures of any two or more of the members of the group or class are suitable. Description of constituents in chemical terms refers to the constituents at the time of addition to any combination specified in the description and does not necessarily preclude chemical interactions among constituents of the mixture once mixed.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

The term "substantially" may be used herein to describe disclosed or claimed embodiments. The term "substantially" may modify any value or relative characteristic disclosed or claimed in the present disclosure. "Substantially" may signify that the value or relative characteristic it modifies is within ±0%, 0.1%, 0.5%, 1%, 2%, 3%, 4%, 5% or 10% of the value or relative characteristic.

Reference is being made in detail to compositions, embodiments, and methods of embodiments known to the inventors. However, disclosed embodiments are merely exemplary of the present disclosure which may be embodied in various and alternative forms. Therefore, specific details disclosed herein are not to be interpreted as limiting, rather merely as representative bases for teaching one skilled in the art to variously employ the present disclosure.

Ferrous materials, such as steel, are commonly used to fabricate components in an electrochemical device, such as in a fuel cell or electrolyzer system. Non-limiting examples of these components are bipolar plates, fuel storage tanks, connecting pipes, safety valves, or heat exchangers. Although ferrous materials provide an economical and viable solution to manufacture these components, the materials are susceptible to hydrogen-related degradations, such as hydrogen embrittlement, when they are exposed to hydrogen ($H_2$). Hydrogen embrittlement may make the materials brittle, leading to a significant loss of ductility of the materials.

$H_2$ gas is one of the reactants used in a fuel cell system, making metal components in the fuel cell system susceptible to hydrogen-related degradations. Similarly, because $H_2$ gas can be produced via an electrolysis process conducted by an electrolyzer system, metal components in the electrolyzer system may be exposed to the produced $H_2$ gas and subject to hydrogen-related degradations. Therefore, in order to maintain a healthy environment in the fuel cell or electrolyzer systems as well as other electrochemical devices, there is a need to protect the metal components in these electrochemical devices from hydrogen-related degradations.

Aspects of the present disclosure relate to a material which may be applied to or formed within a metal component in an electrochemical device, such as in a fuel cell or electrolyzer system, to protect the metal component from hydrogen-related degradations (e.g. hydrogen embrittlement). The metal component may be bipolar plates, fuel storage tanks, connecting pipes, safety valves, or heat exchangers. The metal component may be made of stainless steel. The metal component may also be made of Ti-based or Al-based alloys. In one embodiment, aspects of the present disclosure relate to a metal component of an electrochemical device made of stainless steel, where the stainless steel is characterized by a microstructure containing an intermetallic compound. The intermetallic compound may be $Cr_3Si$, $Mn_3Si$, $SiMo_3$, $SiNi_2$, $Mn_6Si_7Ni_{16}$, MnSiNi, $Si_{12}Ni_{31}$, $Fe_3Si$, $Si_3Mo_5$, $Mn_2FeSi$, FeSi, $Mn_2CrSi$, MnSi, $MnFe_2Si$, $Si_2Mo$, $Fe_{11}Si_5$, $Fe_2Si$, $MnNi_3$, $Mn_2SiMo$, $Fe_5Si_3$, $Mn_4Si_7$, $Ni_3Mo$, $FeNi_3$, $CrSi_2$, $FeSi_2$, $Fe_2Mo$, SiNi, MnCrFeSi, $Fe_7Mo_6$, $Ni_4Mo$, FeNi, FeSiMo, $Si_2Ni$, $CrNi_3$, $SiNi_3$, or a combination thereof. In another embodiment, aspects of the present disclosure relate to a metal component of an electrochemical device made of stainless steel, where the metal component includes at least one surface. At least one surface coating layer of a protective coating material is applied to the at least one surface. The protective coating material may be a carbide material, including $Ni_6Mo_6C$, $Cr_{21}Mo_2C_6$, $Mn_{23}C_6$, $Cr_{23}C_6$, $Fe_{23}C_6$, $Ni_2Mo_4C$, $Mn_3Mo_3C$, $Si_3Mo_5C$, $Fe_3Mo_3C$, $Cr_7C_3$, $Mn_7C_3$, $Mn_5SiC$, $Mn_5C_2$, $Mo_2C$, $Mn_3C$, $Cr_3C_2$, $Cr_3C$, or a combination thereof. The protective coating material may also be a MAX phase compound material, including $Nb_4AlC_3$, $Ti_4AlN_3$, $Nb_2SnC$, $Ti_3SnC_2$, $Zr_2SC$, $Ti_2SnC$, $Zr_2SnC$, $Nb_2PC$, $Nb_2AlC$, $Ti_3SiC_2$, $Ti_3AlC_2$, $Ti_2SC$, $V_2PC$, or a combination thereof.

Stainless steel (SS) is a generic name for different steel compositions. Typically, nearly all stainless steels contain at least 10% chromium (Cr). Cr can form a stable chrome-oxide surface layer on the SS to prevent degradation of the SS. Two most popular SS compositions are SS304 and SS316, where SS304 contains 18-20 weight percent (wt %) Cr and 8-10.5 wt % nickel (Ni), and SS316 contains 16-18 wt % Cr, 10-14 wt % Ni, and 2-3 wt % molybdenum (Mo). In addition to Cr, Ni, and Mo, SS may also include elements such as carbon (C, around 0.08 wt %), manganese (Mg, around 1 to 2 wt %), silicon (Si, around 0.5 to 2 wt %), nitrogen (N, around 0.01 to 0.1 wt %), copper (Cu, around 0.5 to 2 wt %), cobalt (Co, around less than 0.5 wt %) and the balance iron (Fe). The SS composition may vary depending on an application of the SS such that the SS can provide a sustainable mechanical stability, corrosion resistance, and magnetic property.

SS316L is one of the variants of SS316. The difference between SS316L and SS316 is that SS316L has a much lower carbon content than SS316, making SS316L suitable for welding. Particularly, SS316L includes 0.03 wt % C, 16-18 wt % Cr, 10-14 wt % Ni, 2 wt % Mn, 0.75 wt % Si, 0.01 wt % N, 0.045 wt % P, 0.03 wt % S, 2-3 wt % Mo, and the balance Fe. Converting wt % into mol % gives a chemical formula of SS316L as $Fe_{65.2}Cr_{18.1}Ni_{11.3}Mn_2Mo_{1.5}Si_{1.5}C_{0.1}P_{0.1}S_{0.1}$. According to this chemical formula, SS316L has a small amount of C, P, or S.

FIG. 1 depicts a chemical space of Fe—Cr—Ni—Mn—Mo—Si—O, a 7-dimensional phase diagram generated on the Open Quantum Materials Database (oqmd.org). The oqmd.org is a database of density functional theory (DFT) calculated thermodynamic and structural properties of 637,644 materials. The chemical space of Fe—Cr—Ni—Mn—Mo—Si—O is relevant to the composition of SS316L. As shown in FIG. 1, there are 64 stable compounds in four categories: binary oxides, ternary oxides (or higher), binary intermetallics, or ternary intermetallics (or higher). Each line corresponds to a two-phase equilibrium. These compounds are predicted to be stable at a temperature of 0 K (−273.15° C.) and above.

Table 1 lists the compounds defined by the chemical space of Fe—Cr—Ni—Mn—Mo—Si—O described in FIG. 1. Additionally, Table 1 provides some other compounds which may be stable at temperatures between around room temperature and up to around 130° C. and which may be stable at temperatures between around 130° C. and up to around 250° C. Table 1 categorizes these compounds based on their types (e.g. oxides or intermetallics) and stabilities of the compounds. For example, binary intermetallics that are stable at a temperature of around 0 K include $Cr_3Si$, $CrNi_3$, $CrSi_2$, $Fe_2Mo$, $Fe_3Si$, FeNi, $FeNi_3$, FeSi, $FeSi_2$, $Mn_3Si$, $Mn_4Si_7$, $MnNi_3$, MnSi, $Ni_3Mo$, $Ni_4Mo$, $Si_{12}Ni_{31}$, $Si_2Mo$, $Si_2Ni$, $Si_3Mo_5$, $SiMo_3$, SiNi, $SiNi_2$, and $SiNi_3$. Binary intermetallics that are stable at temperatures between around 1 K and up to around 130° C. include $Fe_7Mo_6$, $Fe_2Si$, $Mn_3Ni$, $Si_2Ni_3$, $MnFe_3$, $Fe_{11}Si_5$, MnFe, $Mn_3Fe$, and $Fe_5Si_3$. Further, binary intermetallics that are stable at temperatures between around 130° C. and up to around 250° C. include $MnCr_3$ and MnNi.

of the DFT algorithms and/or methodologies disclosed herein. The non-volatile storage 16 may also include DFT data 20 supporting the functions, features, calculations, and processes of the one or more embodiments described herein.

TABLE 1

Compounds defined by the chemical space of Fe—Cr—Ni—Mn—Mo—Si—O described in FIG. 1.

| Category | Stable when temperature is | Compounds |
|---|---|---|
| Binary oxides | At 0 K | $Cr_2O_3$, $CrO_2$, $Fe_2O_3$, $Fe_3O_4$, FeO, $Mn_2O_3$, $Mn_3O_4$, MnO, $MnO_2$, $MoO_2$, $MoO_3$, NiO, $NiO_2$, $SiO_2$ |
| | Between 1 K and 130° C. | $Mn_5O_8$ |
| | Between 130° C. and 250° C. | $Mo_2O_3$ |
| Ternary oxides (or higher) | At 0 K | $Cr_2SiO_4$, $CrNiO_4$, $Fe_2Mo_3O_8$, $Fe_2NiO_4$, $Fe_2SiO_4$, $FeMoO_4$, $Mn_2Mo_3O_8$, $Mn_2SiO_4$, $Mn_7SiO_{12}$, $MnCr_2O_4$, $MnFeSiO_4$, $MnMoO_4$, $MnNi_6O_8$, $MnNiO_3$, $MnSiNiO_4$, $NiMoO_4$, $SiNi_2O_4$ |
| | Between 1 K and 130° C. | $MnSiO_3$, $FeSiO_3$, $Cr_2NiO_4$, $FeNiO_2$, $FeNi_2O_4$, $Fe_3Si_2O_8$, $Cr_2FeO_4$ |
| | Between 130° C. and 250° C. | $MnFe_2O_4$, $Fe_5Si_3O_{12}$, $CrNi_2O_4$ |
| Binary intermetallic | At 0 K | $Cr_3Si$, $CrNi_3$, $CrSi_2$, $Fe_2Mo$, $Fe_3Si$, FeNi, $FeNi_3$, FeSi, $FeSi_2$, $Mn_3Si$, $Mn_4Si_7$, $MnNi_3$, MnSi, $Ni_3Mo$, $Ni_4Mo$, $Si_{12}Ni_{31}$, $Si_2Mo$, $Si_2Ni$, $Si_3Mo_5$, $SiMo_3$, SiNi, $SiNi_2$, $SiNi_3$ |
| | Between 1 K and 130° C. | $Fe_7Mo_6$, $Fe_2Si$, $Mn_3Ni$, $Si_2Ni_3$, $MnFe_3$, $Fe_{11}Si_5$, MnFe, $Mn_3Fe$, $Fe_5Si_3$ |
| | Between 130° C. and 250° C. | $MnCr_3$, MnNi |
| Ternary intermetallic (or higher) | At 0 K | $Mn_2FeSi$, $Mn_6Si_7Ni_{16}$, MnSiNi |
| | Between 1 K and 130° C. | $MnFe_2Si$, $Mn_2CrSi$, FeSiMo |
| | Between 130° C. and 250° C. | $MnCrFe_2$, $Mn_2SiMo$, MnCrFeSi |

Figure 2:
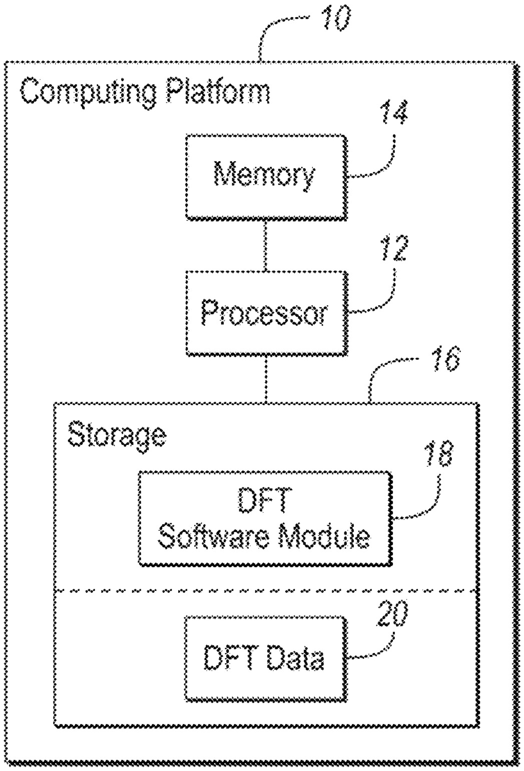
FIG. 2 depicts a schematic diagram of a computing platform that may be utilized to implement a data-driven materials screening method.

FIG. 2 depicts a schematic diagram of a computing platform that may be utilized to implement a data-driven materials screening method. The computing platform 10 may include a processor 12, a memory 14, and a non-volatile storage 16. The processor 12 may include one or more devices selected from high-performance computing (HPC) systems including high-performance cores, microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory. The memory 14 may include a single memory device or a number of memory devices including random access memory (RAM), volatile memory, non-volatile memory, static random-access memory (SRAM), dynamic random-access memory (DRAM), flash memory, cache memory, or any other device capable of storing information. The non-volatile storage 16 may include one or more persistent data storage devices such as a hard drive, optical drive, tape drive, non-volatile solid-state device, cloud storage or any other device capable of persistently storing information.

The processor 12 may be configured to read into memory and execute computer-executable instructions residing in a DFT software module 18 of the non-volatile storage 16 and embodying DFT slab model algorithms, calculations and/or methodologies of one or more embodiments. The DFT software module 18 may include operating systems and applications. The DFT software module 18 may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by the processor 12, the computer-executable instructions of the DFT software module 18 may cause the computing platform 10 to implement one or more The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. The computer readable storage medium, which is inherently non-transitory, may include volatile and non-volatile, and removable and non-removable tangible media implemented in any method or technology for storage of information, such as computer-readable instructions, data structures, program modules, or other data. The computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in the computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

Referring to FIG. 2, the data-driven materials screening method may be utilized to screen compounds that are resistant to hydrogen-related degradations (e.g. hydrogen embrittlement) or that are suitable to be used as protective coating materials to protect metal components in electrochemical devices, such in a fuel cell or electrolyzer system, from hydrogen-related degradations. The data-driven materials screening method may evaluate compounds in terms of their reactivities against $H_2$, including the reactivity of a compound when there is a dilute amount of $H_2$ or an abundant amount of $H_2$ in a reaction environment.

To better understand the reactivity of each compound against $H_2$, the data-driven materials screening method is first used to examine the reactivity of Fe against $H_2$ under similar conditions. The reactivity of Fe against $H_2$ may then be used as a reference to identify compounds that are comparably less reactive against $H_2$ than Fe.

Figure 3:
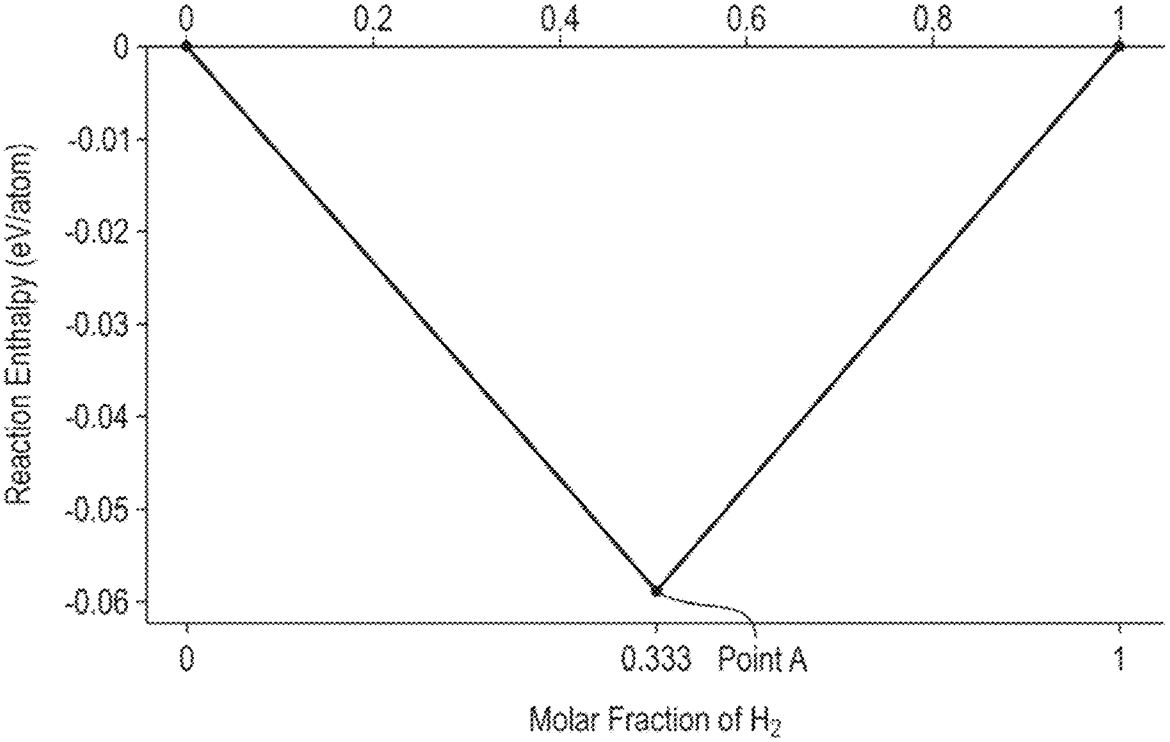
FIG. 3 depicts a schematic phase diagram showing a reaction enthalpy (eV/atom) of a reaction between Fe and $H_2$ as a function of a molar fraction of $H_2$ in a reaction environment.

FIG. 3 depicts a schematic phase diagram showing a reaction enthalpy (eV/atom) of a reaction between Fe and $H_2$ as a function of a molar fraction of $H_2$ in a reaction environment. The molar fraction of $H_2$ is in a range of 0 and 1. As shown in FIG. 3, when the molar fraction of $H_2$ is 0, there is no $H_2$ and 100% of Fe in the reaction environment. Conversely, when the molar fraction of $H_2$ is 1, there is no Fe and 100% $H_2$ in the reaction environment. As the molar fraction of $H_2$ increases from 0, a reaction occurs at Point A, where the molar fraction of $H_2$ is about 0.333 and the reaction enthalpy of the reaction is about −0.059 eV/atom. Reaction (1) is expressed below to illustrate the reaction:

$$0.333\ H_2 + 0.667\ Fe \longrightarrow 0.667\ FeH \tag{1}$$

According to reaction (1), after reacting with $H_2$, Fe is turned into iron(I) hydride (FeH). In this scenario, reaction (1) appears to be the only reaction between Fe and $H_2$, and FeH does not appear to further react with $H_2$.

Figure 4:
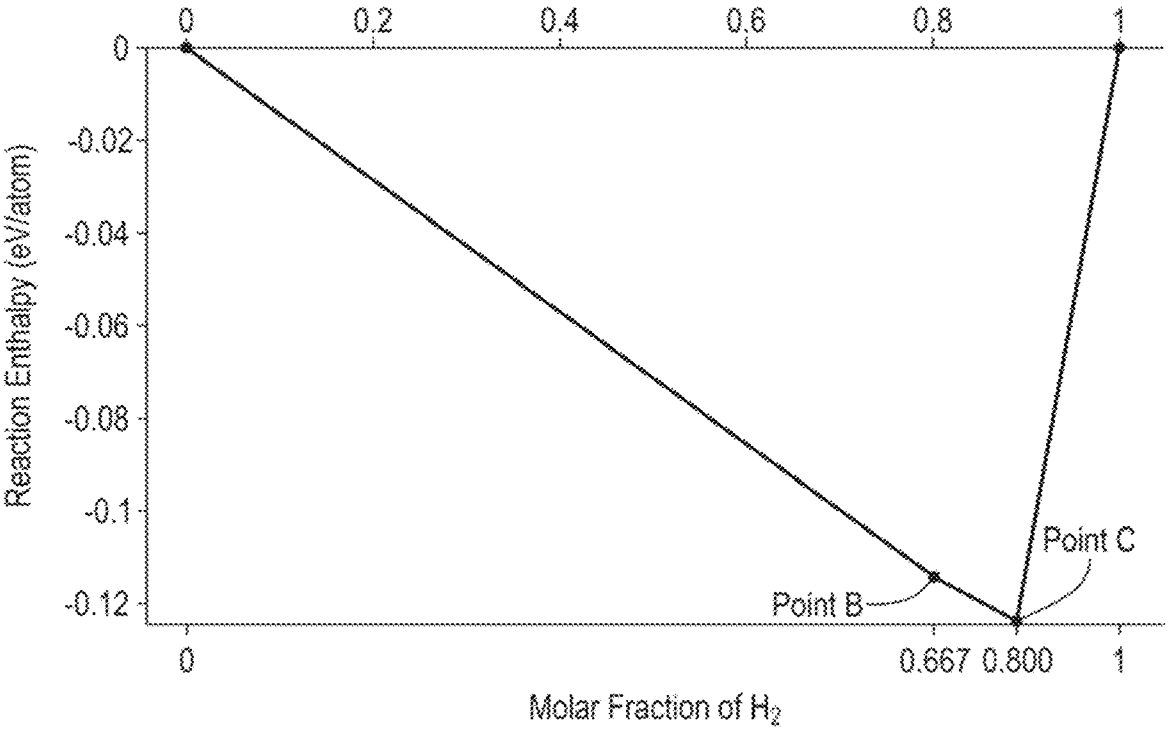
FIG. 4 depicts a schematic phase diagram showing a reaction enthalpy (eV/atom) of a reaction between Si and $H_2$ as a function of a molar fraction of $H_2$ in a reaction environment.

FIG. 4 depicts a schematic phase diagram showing a reaction enthalpy (eV/atom) of a reaction between Si and $H_2$ as a function of a molar fraction of $H_2$ in a reaction environment. Si is one of the elements in stainless steel. The molar fraction of $H_2$ is in a range of 0 and 1. As shown in FIG. 4, when the molar fraction of $H_2$ is 0, there is no $H_2$ and 100% of Si in the reaction environment. Conversely, when the molar fraction of Si is 1, there is no Si and 100% $H_2$ in the reaction environment. As the molar fraction of $H_2$ increases from 0, a first stable decomposition reaction occurs at Point B, where the molar fraction of $H_2$ is about 0.667 and the reaction enthalpy of the first stable decomposition reaction is about −0.107 eV/atom. The first stable decomposition reaction occurs when there is a dilute amount $H_2$ in the reaction environment. Reaction (2) is expressed below to illustrate the first stable decomposition reaction:

$$0.667\ H_2 + 0.333\ Si \longrightarrow 0.333\ SiH_4 \tag{2}$$

According to reaction (2), after reacting with the dilute amount of $H_2$, Si is turned into silane ($SiH_4$). Continue referring to FIG. 4, as the molar fraction of $H_2$ keeps increasing, the most stable decomposition reaction may occur at Point C, where the molar fraction of $H_2$ is about 0.800 and the reaction enthalpy of the most stable decomposition reaction is about −0.116 eV/atom. The most stable decomposition reaction occurs when there is an abundant amount of $H_2$ in the reaction environment. Reaction (3) is included hereby to illustrate the most stable decomposition reaction:

$$0.8\ H_2 + 0.2\ Si \longrightarrow 0.2\ SiH_8 \tag{3}$$

According to reaction (3), after reacting with the abundant amount of $H_2$, Si is turned into $SiH_8$. Referring to reactions (2) and (3), the reaction enthalpy and the product of the reaction between Si and $H_2$ may depend on the amount of $H_2$ available in the reaction environment.

Apart from reacting with Fe and Si, $H_2$ may also react with other elements in the stainless steel, including Cr, Ni, Mn, and Mo. The data-driven materials screening method may be further employed to study the reactivities of these elements against $H_2$ under similar conditions. In each scenario, there may be a first stable decomposition reaction between the element and $H_2$, which occurs when the concentration of $H_2$ is dilute in the reaction environment. In addition, in each scenario, there may be the most stable decomposition reaction between the element and $H_2$, which occurs when the concentration of $H_2$ is abundant in the reaction environment. It may be possible that the first stable decomposition reaction and the most stable decomposition reaction between the element and $H_2$ are identical, like the case for Fe. The reaction enthalpy of each reaction, if possible, may also be calculated using the data-driven materials screening method.

Table 2 depicts information of a first stable decomposition reaction between a dilute amount of $H_2$ and Fe, Cr, Ni, Mn, Mo, or Si, respectively. Particularly, Table 2 provides a reaction equation, if possible, of the first stable decomposition reaction and a reaction enthalpy of each reaction. To easily compare the reactivity of each element against $H_2$, Table 2 provides a molar fraction between $H_2$ and each element. Table 2 further provides a penalty point (e.g. PP1) regarding the molar fraction, where PP1 of 1.00 is assigned to the reference reaction between Fe and the dilute amount of $H_2$. In addition, Table 2 provides another penalty point (e.g. PP2) regarding the reaction enthalpy of each reaction, where PP2 of 1.00 is assigned to the reaction enthalpy of the reaction between Fe and the dilute amount of $H_2$.

TABLE 2

Information of a first stable decomposition reaction between a dilute amount of $H_2$ and Fe, Cr, Ni, Mn, Mo, or Si, respectively.

| Element | Equation of a first stable decomposition reaction | Molar fraction | PP1 | Reaction enthalpy (eV/atom) | PP2 |
|---|---|---|---|---|---|
| Fe (reference) | $0.333\ H_2 + 0.667\ Fe \rightarrow 0.667\ FeH$ | 0.50 | 1.00 | −0.059 | 1.00 |
| Cr | $0.333\ H_2 + 0.667\ Cr \rightarrow 0.667\ CrH$ | 0.50 | 1.00 | −0.052 | 0.88 |
| Ni | $0.333\ H_2 + 0.667\ Ni \rightarrow 0.667\ NiH$ | 0.50 | 1.00 | −0.112 | 1.90 |
| Mn | $0.033\ H_2 + 0.967\ Mn \rightarrow 0.033\ Mn_{29}H_2$ | 0.03 | 14.65 | −0.033 | 0.56 |
| Mo | No Reaction | N/A | 0.00 | N/A | 0.00 |
| Si | $0.667\ H_2 + 0.333\ Si \rightarrow 0.333\ SiH_4$ | 2.00 | 0.25 | −0.107 | 1.81 |

As illustrated in Table 2, Cr and Ni, when reacting with a dilute amount of $H_2$, require the same amount of $H_2$ as Fe. Mn consumes less $H_2$ per mol than Fe. Mo does not appear to react with $H_2$ when the concentration of $H_2$ is dilute in the reaction environment. Further, Si consumes more $H_2$ per mol than Fe. On the other hand, Cr and Mn appear to be comparably less reactive with $H_2$ when compared to Fe, and Ni and Si appear to be comparably more reactive with $H_2$ when compared to Fe. In summary, when reacting with a dilute amount of $H_2$, Mn requires the least amount of $H_2$ among these elements (except Mo), and is comparably the least reactive element to react with a dilute amount of $H_2$.

Table 3 depicts information of the most stable decomposition reaction between an abundant amount of $H_2$ and Fe, Cr, Ni, Mn, Mo, or Si, respectively. Particularly, Table 3 provides a reaction equation, if possible, of the most stable decomposition reaction and a reaction enthalpy of each reaction. To easily compare the reactivity of each element against $H_2$, Table 3 provides a molar fraction between $H_2$ and each element. Table 3 further provides a penalty point (e.g. PP3) regarding the molar fraction, where PP3 of 1.00 is assigned to the reference reaction between Fe and the abundant amount of $H_2$. In addition, Table 3 provides another penalty point (e.g. PP4) regarding the reaction enthalpy of each reaction, where PP4 of 1.00 is assigned to the reaction enthalpy of the reaction between Fe and the abundant amount of $H_2$.

TABLE 3

Information of the most stable decomposition reaction between an abundant amount of $H_2$ and Fe, Cr, Ni, Mn, Mo, or Si, respectively.

| Element | Equation of the most stable decomposition reaction | Molar fraction | PP3 | Reaction enthalpy (eV/atom) | PP4 |
|---|---|---|---|---|---|
| Fe (reference) | $0.333\ H_2 + 0.667\ Fe \rightarrow 0.667\ FeH$ | 0.50 | 1.00 | −0.059 | 1.00 |
| Cr | $0.333\ H_2 + 0.667\ Cr \rightarrow 0.667\ CrH$ | 0.50 | 1.00 | −0.052 | 0.88 |
| Ni | $0.333\ H_2 + 0.667\ Ni \rightarrow 0.667\ NiH$ | 0.50 | 1.00 | −0.112 | 1.90 |
| Mn | $0.033\ H_2 + 0.967\ Mn \rightarrow 0.033\ Mn_{29}H_2$ | 0.03 | 14.65 | −0.033 | 0.56 |
| Mo | No reaction | N/A | 0.00 | N/A | 0.00 |
| Si | $0.8\ H_2 + 0.2\ Si \rightarrow 0.2\ SiH_8$ | 4.00 | 0.13 | −0.116 | 1.97 |

As illustrated in Table 3, Cr and Ni, when reacting with an abundant amount of $H_2$, require the same amount of $H_2$ as Fe. Mn consumes less $H_2$ per mol than Fe. Mo does not appear to react with $H_2$ when the concentration of $H_2$ is abundant in the reaction environment. Further, Si consumes more $H_2$ per mol than Fe. On the other hand, Cr and Mn appear to be comparably less reactive with $H_2$ when compared to Fe, and Ni and Si appear to be comparably more reactive with $H_2$ when compared to Fe. In summary, when reacting with an abundant amount of $H_2$, Mn requires the comparably least amount of $H_2$ among these elements (except Mo), and is comparably the least reactive element to react with an abundant amount of $H_2$.

In view of Tables 2 and 3, the first stable decomposition reaction and the most stable decomposition reaction between $H_2$ and Fe, Cr, Ni, or Mn, respectively, are identical. Mo does not react with $H_2$. In both scenarios, Si appears to consume the most $H_2$, and the reaction between Si and $H_2$ appears to be more favorable than that of Fe.

Now, a process for screening the compounds in Table 1 is described. Specifically, the present disclosure describes the process for screening the intermetallic compounds in Table 1. Other compounds in Table 1 may be evaluated using the same or substantially the same screening process. Using the data-driven materials screening method, each intermetallic compound in Table 1 is evaluated in terms of its reactivity against $H_2$. Afterwards, the reactivity of each intermetallic compound against $H_2$ is compared with that of Fe to identify intermetallic compounds that are comparably resistant to hydrogen-related degradations (e.g. hydrogen embrittlement).

Table 4 depicts information of a first stable decomposition reaction between each intermetallic compound in Table 1 and a dilute amount of $H_2$. Table 4 provides a reaction equation, if possible, of the first stable decomposition reaction and a reaction enthalpy of each reaction. To take the stability of each intermetallic compound into consideration, a penalty point (e.g. PP5) is assigned to each intermetallic compound. Particularly, the intermetallic compounds which are stable at a temperature of around 0 K are assigned a PP5 of 0. Further, the intermetallic compounds which are stable at temperatures between around 1 K and up to around 130° C. are assigned a PP5 of 1. In addition, the intermetallic compounds which are stable at temperatures between around 130° C. and up to around 250° C. are assigned a PP5 of 2.

Table 4 also provides a molar fraction between the dilute amount of $H_2$ and each intermetallic compound. Further, Table 4 provides another penalty point (e.g. PP6) regarding the molar fraction, where PP6 of 1.00 is assigned to the reference reaction between Fe and the dilute amount of $H_2$ (i.e. the molar fraction is 0.50, as listed in Table 2). PP6 is calculated by dividing the molar fraction between the dilute amount of $H_2$ and Fe by the molar fraction between the dilute amount of $H_2$ and each intermetallic compound. For example, since the molar fraction between the dilute amount of $H_2$ and $CrNi_3$ is 0.50, PP6 thus equals 0.50/0.50, which is around 1.00.

Table 4 further provides a reaction enthalpy (eV/atom) of the reaction between the dilute amount of $H_2$ and each intermetallic compound. Table 4 also provides another penalty point (e.g. PP7) regarding the reaction enthalpy, where PP7 of 1.00 is assigned to the reference reaction between Fe and the dilute amount of $H_2$ (i.e. −0.059 eV/atom, as listed in Table 2). PP7 is calculated by dividing the reaction enthalpy between the dilute amount of $H_2$ and each intermetallic compound by that between the dilute amount of $H_2$ and Fe. For example, since the reaction enthalpy between the dilute amount of $H_2$ and $CrNi_3$ is −0.045, PP7 thus equals −0.045/−0.059, which is about 0.76.

TABLE 4

Information of a first stable decomposition reaction between each intermetallic compound in Table 1 and a dilute amount of $H_2$.

| Intermetallic compound | PP5 | Equation of a first stable decomposition reaction with a dilute amount of $H_2$ | Molar fraction | PP6 | Reaction enthalpy (eV/atom) | PP7 |
|---|---|---|---|---|---|---|
| Fe (reference) | N/A | $0.333\ H_2 + 0.667\ Fe \rightarrow 0.667\ FeH$ | 0.50 | 1.00 | −0.059 | 1.00 |
| $Cr_3Si$ | 0 | No Reaction | N/A | 0.00 | N/A | 0.00 |
| $CrNi_3$ | 0 | $0.333\ H_2 + 0.667\ CrNi_3 \rightarrow 0.667\ NiH + 0.667\ CrNi_2$ | 0.50 | 1.00 | −0.045 | 0.76 |
| $CrSi_2$ | 0 | $0.87\ H_2 + 0.13\ CrSi_2 \rightarrow 0.217\ SiH_8 + 0.043\ Cr_3Si$ | 6.69 | 0.07 | −0.066 | 1.12 |
| $Fe_2Mo$ | 0 | $0.5\ H_2 + 0.5\ Fe_2Mo \rightarrow FeH + 0.5\ Mo$ | 1.00 | 0.50 | −0.047 | 0.80 |
| $Fe_3Si$ | 0 | $0.846\ H_2 + 0.154\ Fe_3Si \rightarrow 0.154\ SiH_8 + 0.462\ FeH$ | 5.49 | 0.09 | −0.009 | 0.15 |
| FeNi | 0 | $0.5\ H_2 + 0.5\ FeNi \rightarrow 0.5\ FeH + 0.5\ NiH$ | 1.00 | 0.50 | −0.051 | 0.86 |
| $FeNi_3$ | 0 | $0.5\ H_2 + 0.5\ FeNi_3 \rightarrow 0.5\ FeNi + NiH$ | 1.00 | 0.50 | −0.039 | 0.66 |
| FeSi | 0 | $0.727\ H_2 + 0.273\ FeSi \rightarrow 0.182\ SiH_8 + 0.091\ Fe_3Si$ | 2.66 | 0.19 | −0.013 | 0.22 |
| $FeSi_2$ | 0 | $0.8\ H_2 + 0.2\ FeSi_2\ 0.2\ SiH_8 + 0.2\ FeSi$ | 4.00 | 0.13 | −0.067 | 1.14 |
| $Mn_3Si$ | 0 | No Reaction | N/A | 0.00 | N/A | 0.00 |
| $Mn_4Si_7$ | 0 | $0.923\ H_2 + 0.077\ Mn_4Si_7 \rightarrow 0.231\ SiH_8 + 0.308\ MnSi$ | 11.99 | 0.04 | −0.060 | 1.02 |
| $MnNi_3$ | 0 | $0.605\ H_2 + 0.395\ MnNi_3 \rightarrow 1.184\ NiH + 0.014\ Mn_{29}H_2$ | 1.53 | 0.33 | −0.036 | 0.61 |
| MnSi | 0 | $0.727\ H_2 + 0.273\ MnSi \rightarrow 0.182\ SiH_8 + 0.091\ Mn_3Si$ | 2.66 | 0.19 | −0.026 | 0.44 |
| $Ni_3Mo$ | 0 | $0.6\ H_2 + 0.4\ Ni_3Mo \rightarrow Mo + 1.2\ NiH$ | 1.50 | 0.33 | −0.044 | 0.75 |

TABLE 4-continued

Information of a first stable decomposition reaction between each intermetallic compound in Table 1 and a dilute amount of $H_2$.

| Intermetallic compound | PP5 | Equation of a first stable decomposition reaction with a dilute amount of $H_2$ | Molar fraction | PP6 | Reaction enthalpy (eV/atom) | PP7 |
|---|---|---|---|---|---|---|
| $Ni_4Mo$ | 0 | $0.333\ H_2 + 0.667\ Ni_4Mo \rightarrow 0.667\ Ni_3Mo + 0.667\ NiH$ | 0.50 | 1.00 | −0.031 | 0.53 |
| $Si_{12}Ni_{31}$ | 0 | $0.778\ H_2 + 0.222\ Sil_2Ni3_1 \rightarrow 1.556\ NiH + 2.667\ SiNi_2$ | 3.50 | 0.14 | −0.005 | 0.08 |
| $Si_2Mo$ | 0 | $0.848\ H_2 + 0.152\ Si_2Mo \rightarrow 0.212\ SiH_8 + 0.03\ Si_3Mo_5$ | 5.58 | 0.09 | −0.043 | 0.73 |
| $Si_2Ni$ | 0 | $0.8\ H_2 + 0.2\ Si_2Ni \rightarrow 0.2\ SiH_8 + 0.2\ SiNi$ | 4.00 | 0.13 | −0.088 | 1.49 |
| $Si_3Mo_5$ | 0 | $0.848\ H_2 + 0.158\ Si_3Mo_5 \rightarrow 0.211\ SiH_8 + 0.263\ SiMo_3$ | 5.33 | 0.09 | −0.013 | 0.22 |
| SiMo3 | 0 | No Reaction | N/A | 0.00 | N/A | 0.00 |
| SiNi | 0 | $0.667\ H_2 + 0.333\ SiNi \rightarrow 0.167\ SiH_8 + 0.167\ SiNi_2$ | 2.00 | 0.25 | −0.062 | 1.05 |
| $SiNi_2$ | 0 | No Reaction | N/A | 0.00 | N/A | 0.00 |
| $SiNi_3$ | 0 | $0.172\ H_2 + 0.828\ SiNi_3 \rightarrow 0.069\ Sil_2Ni3_1 + 0.345\ NiH$ | 0.21 | 2.41 | −0.006 | 0.10 |
| $Fe_7Mo_6$ | 1 | $0.778\ H_2 + 0.222\ Fe_7Mo_6 \rightarrow 1.556\ FeH + 1.333\ Mo$ | 3.50 | 0.14 | −0.041 | 0.69 |
| $Fe_2Si$ | 1 | $0.571\ H_2 + 0.429\ Fe_2Si \rightarrow 0.143\ SiH_8 + 0.286\ Fe_3Si$ | 1.33 | 0.38 | −0.011 | 0.19 |
| $Mn_3Ni$ | 1 | $0.084\ H_2 + 0.916\ Mn_3Ni \rightarrow 0.305\ MnNi_3 + 0.084\ Mn_{29}H_2$ | 0.09 | 5.45 | −0.022 | 0.37 |
| $Si_2Ni_3$ | 1 | $0.667\ H_2 + 0.333\ Si_2Ni_3 \rightarrow 0.167\ SiH_8 + 0.5\ SiNi_2$ | 2.00 | 0.25 | −0.420 | 7.12 |
| MnFe3 | 1 | $0.033\ H_2 + 0.967\ MnFe_3 \rightarrow 2.9\ Fe + 0.333\ Mn_{29}H_2$ | 0.03 | 14.65 | −0.009 | 0.15 |
| $Fe_{11}Si_5$ | 1 | $0.842\ H_2 + 0.158\ Fe_{11}Si_5 \rightarrow 0.211\ SiH_8 + 0.579\ Fe_3Si$ | 5.33 | 0.09 | −0.018 | 0.31 |
| MnFe | 1 | $0.033\ H_2 + 0.967\ MnFe \rightarrow 0.967\ Fe + 0.333\ Mn_{29}H_2$ | 0.03 | 14.65 | −0.017 | 0.29 |
| $Mn_3Fe$ | 1 | $0.094\ H_2 + 0.906\ Mn_3Fe \rightarrow 0.906\ Fe + 0.094\ Mn_{29}H_2$ | 0.10 | 4.82 | −0.025 | 0.42 |
| $Fe_5Si_3$ | 1 | $0.842\ H_2 + 0.158\ Fe_5Si_3 \rightarrow 0.211\ SiH_8 + 0.263\ Fe_3Si$ | 5.33 | 0.09 | −0.024 | 0.41 |
| $MnCr_3$ | 2 | $0.033\ H_2 + 0.967\ MnCr_3 \rightarrow 0.033\ Mn_{29}H_2 + 2.9\ Cr$ | 0.03 | 14.65 | −0.009 | 0.15 |
| MnNi | 2 | $0.022\ H_2 + 0.978\ MnNi \rightarrow 0.326\ MnNi_3 + 0.022\ Mn_{29}H_2$ | 0.02 | 22.23 | −0.047 | 0.80 |
| $Mn_2FeSi$ | 0 | $0.647\ H_2 + 0.353\ MnFeSi \rightarrow 0.353\ FeH + 0.235\ Mn_3Si + 0.118\ SiH_8$ | 1.83 | 0.27 | −0.003 | 0.05 |
| $Mn_6Si_7Ni_{16}$ | 0 | No Reaction | N/A | 0.00 | N/A | 0.00 |
| MnSiNi | 0 | No Reaction | N/A | 0.00 | N/A | 0.00 |
| $MnFe_2Si$ | 1 | $0.786\ H_2 + 0.214\ MnFe_2Si \rightarrow 0.429\ FeH + 0.071\ Mn_3Si + 0.143\ SiH_8$ | 3.67 | 0.14 | −0.004 | 0.07 |
| $Mn_2CrSi$ | 1 | No Reaction | N/A | 0.00 | N/A | 0.00 |
| FeSiMo | 1 | $0.571\ H_2 + 0.429\ FeSiMo \rightarrow 0.143\ SiMo_3 + 0.143\ SiH_8 + 0.143\ Fe_3Si$ | 1.33 | 0.38 | −0.036 | 0.61 |
| $MnCrFe_2$ | 2 | $0.033\ H_2 + 0.967\ MnCrFe_2 \rightarrow 0.967\ Cr + 0.033\ Mn_{29}H_2 + 1.933\ Fe$ | 0.03 | 14.65 | −0.009 | 0.15 |

TABLE 4-continued

Information of a first stable decomposition reaction between each intermetallic compound in Table 1 and a dilute amount of $H_2$.

| Intermetallic compound | PP5 | Equation of a first stable decomposition reaction with a dilute amount of $H_2$ | Molar fraction | PP6 | Reaction enthalpy (eV/atom) | PP7 |
|---|---|---|---|---|---|---|
| $Mn_2SiMo$ | 2 | No Reaction | N/A | 0.00 | N/A | 0.00 |
| MnCrFeSi | 2 | $0.647\ H_2 + 0.353\ MnCrFeSi \rightarrow 0.118\ SiH_8 + 0.118\ Mn_3Si + 0.118\ Cr_3Si + 0.353\ FeH$ | 1.83 | 0.27 | −0.003 | 0.05 |

Table 5 depicts information of the most stable decomposition reaction between each intermetallic compound in Table 1 and an abundant amount of $H_2$. Particularly, Table 5 provides a reaction equation, if possible, of the most stable decomposition reaction and a reaction enthalpy of each reaction. Table 5 also provides a molar fraction between the abundant amount of $H_2$ and each intermetallic compound. Further, Table 5 provides a penalty point (e.g. PP8) regarding the molar fraction, where PP8 of 1.00 is assigned to the reference reaction between Fe and the abundant amount of $H_2$ (i.e. the molar fraction is 0.50, as listed in Table 3). PP8 is calculated by dividing the molar fraction between the abundant amount of $H_2$ and Fe by the molar fraction between the abundant amount of $H_2$ and each intermetallic compound. For example, since the molar fraction between the abundant amount of $H_2$ and $CrNi_3$ is 2.00, PP8 thus equals 0.50/2.00, which is around 0.25.

Table 5 further provides a reaction enthalpy (eV/atom) of the reaction between the abundant amount of $H_2$ and each intermetallic compound. Table 5 also provides another penalty point (e.g. PP9) regarding the reaction enthalpy of the reaction, where PP9 of 1.00 is assigned to the reference reaction between Fe and the abundant amount of $H_2$ (i.e. −0.059 eV/atom, as listed in Table 3). PP9 is calculated by dividing the reaction enthalpy between the abundant amount of $H_2$ and each intermetallic compound by that between the abundant amount of $H_2$ and Fe. For example, since the reaction enthalpy between the abundant amount of $H_2$ and $CrNi_3$ is −0.089, PP9 thus equals −0.089/−0.059, which is about 1.51.

TABLE 5

Information of the most stable decomposition reaction between each intermetallic compound in Table 1 and an abundant amount of $H_2$.

| Intermetallic compound | Equation of the most stable decomposition reaction with an abundant amount of $H_2$ | Molar fraction | PP8 | Reaction enthalpy (eV/atom) | PP9 |
|---|---|---|---|---|---|
| Fe (reference) | $0.333\ H_2 + 0.667\ Fe \rightarrow 0.667\ FeH$ | 0.50 | 1.00 | −0.059 | 1.00 |
| $Cr_3Si$ | No Reaction | N/A | 0.00 | N/A | 0.00 |
| $CrNi_3$ | $0.667\ H_2 + 0.333\ CrNi_3 \rightarrow 0.333\ CrH + NiH$ | 2.00 | 0.25 | −0.089 | 1.51 |
| $CrSi_2$ | $0.87\ H_2 + 0.13\ CrSi_2 \rightarrow 0.217\ SiH_8 + 0.043\ Cr_3Si$ | 6.69 | 0.07 | −0.066 | 1.12 |
| $Fe_2Mo$ | $0.5\ H_2 + 0.5\ Fe_2Mo \rightarrow FeH + 0.5\ Mo$ | 1.00 | 0.50 | −0.047 | 0.80 |
| $Fe_3Si$ | $0.846\ H_2 + 0.154\ Fe_3Si \rightarrow 0.154\ SiH_8 + 0.462\ FeH$ | 5.49 | 0.09 | −0.009 | 0.15 |
| FeNi | $0.5\ H_2 + 0.5\ FeNi \rightarrow 0.5\ FeH + 0.5\ NiH$ | 1.00 | 0.50 | −0.051 | 0.86 |
| $FeNi_3$ | $0.667\ H_2 + 0.333\ FeNi_3 \rightarrow 0.333\ FeH + NiH$ | 2.00 | 0.25 | −0.055 | 0.93 |
| FeSi | $0.727\ H_2 + 0.273\ FeSi \rightarrow 0.182\ SiH_8 + 0.091\ Fe_3Si$ | 2.66 | 0.19 | −0.013 | 0.22 |
| $FeSi_2$ | $0.8\ H_2 + 0.2\ FeSi_2 \rightarrow 0.2\ SiH_8 + 0.2\ FeSi$ | 4.00 | 0.13 | −0.067 | 1.14 |
| $Mn_3Si$ | No Reaction | N/A | 0.00 | N/A | 0.00 |
| $Mn_4Si_7$ | $0.923\ H_2 + 0.077\ Mn_4Si_7 \rightarrow 0.231\ SiH_8 + 0.308\ MnSi$ | 11.99 | 0.04 | −0.060 | 1.02 |
| $MnNi_3$ | $0.605\ H_2 + 0.395\ MnNi_3 \rightarrow 1.184\ NiH + 0.014\ Mn_{29}H_2$ | 1.53 | 0.33 | −0.036 | 0.61 |

TABLE 5-continued

Information of the most stable decomposition reaction between each intermetallic compound in Table 1 and an abundant amount of $H_2$.

| Intermetallic compound | Equation of the most stable decomposition reaction with an abundant amount of $H_2$ | Molar fraction | PP8 | Reaction enthalpy (eV/atom) | PP9 |
|---|---|---|---|---|---|
| MnSi | $0.727\ H_2 + 0.273\ MnSi \rightarrow 0.182\ SiH_8 + 0.091\ Mn_3Si$ | 2.66 | 0.19 | −0.026 | 0.44 |
| $Ni_3Mo$ | $0.6\ H_2 + 0.4\ Ni_3Mo \rightarrow 0.4\ Mo + 1.2\ NiH$ | 1.50 | 0.33 | −0.044 | 0.75 |
| $Ni_4Mo$ | $0.667\ H_2 + 0.333\ Ni_4Mo \rightarrow 0.333\ Mo + 1.333\ NiH$ | 2.00 | 0.25 | −0.055 | 0.93 |
| $Si_{12}Ni_{31}$ | $0.778\ H_2 + 0.222\ Si_{12}Ni_{31} \rightarrow 1.556\ NiH + 2.667\ SiNi_2$ | 3.50 | 0.14 | −0.005 | 0.08 |
| $Si_2Mo$ | $0.848\ H_2 + 0.152\ Si_2Mo \rightarrow 0.212\ SiH_8 + 0.03\ Si_3Mo_5$ | 5.58 | 0.09 | −0.043 | 0.73 |
| $Si_2Ni$ | $0.857\ H_2 + 0.143\ Si_2Ni \rightarrow 0.214\ SiH_8 + 0.071\ SiNi_2$ | 5.99 | 0.08 | −0.089 | 1.51 |
| $Si_3Mo_5$ | $0.842\ H_2 + 0.158\ Si_3Mo_5 \rightarrow 0.211\ SiH_8 + 0.263\ SiMo_3$ | 5.33 | 0.09 | −0.013 | 0.22 |
| $SiMo_3$ | No Reaction | N/A | 0.00 | N/A | 0.00 |
| SiNi | $0.667\ H_2 + 0.333\ SiNi \rightarrow 0.167\ SiH_8 + 0.167\ SiNi_2$ | 2.00 | 0.25 | −0.062 | 1.05 |
| $SiNi_2$ | No Reaction | N/A | 0.00 | N/A | 0.00 |
| $SiNi_3$ | $0.333\ H_2 + 0.667\ SiNi_3 \rightarrow 0.667\ NiH + 0.667\ SiNi_2$ | 0.50 | 1.00 | −0.010 | 0.17 |
| $Fe_7Mo_6$ | $0.778\ H_2 + 0.222\ Fe_7Mo_6 \rightarrow 1.556\ FeH + 1.333\ Mo$ | 3.50 | 0.14 | −0.041 | 0.69 |
| $Fe_2Si$ | $0.833\ H_2 + 0.167\ Fe_2Si \rightarrow 0.167\ SiH_8 + 0.333\ FeH$ | 4.99 | 0.10 | −0.012 | 0.20 |
| $Mn_3Ni$ | $0.376\ H_2 + 0.624\ Mn_3Ni \rightarrow 0.624\ NiH + 0.065\ Mn_{29}H_2$ | 0.60 | 0.83 | −0.034 | 0.58 |
| $Si_2Ni_3$ | $0.667\ H_2 + 0.333\ Si_2Ni_3 \rightarrow 0.167\ SiH_8 + 0.5\ SiNi_2$ | 2.00 | 0.25 | −0.420 | 7.12 |
| $MnFe_3$ | $0.605\ H_2 + 0.395\ MnFe_3 \rightarrow 1.184\ FeH + 0.014\ Mn_{29}H_2$ | 1.53 | 0.33 | −0.055 | 0.93 |
| $Fe_{11}Si_5$ | $0.842\ H_2 + 0.158\ Fe_{11}Si_5 \rightarrow 0.211\ SiH_8 + 0.579\ Fe_3Si$ | 5.33 | 0.09 | −0.018 | 0.31 |
| MnFe | $0.348\ H_2 + 0.652\ MnFe \rightarrow 0.652\ FeH + 0.022\ Mn_{29}H_2$ | 0.53 | 0.94 | −0.050 | 0.85 |
| $Mn_3Fe$ | $0.376\ H_2 + 0.624\ Mn_3Fe \rightarrow 0.624\ FeH + 0.065\ Mn_{29}H_2$ | 0.60 | 0.83 | −0.043 | 0.73 |
| $Fe_5Si_3$ | $0.842\ H_2 + 0.158\ Fe_5Si_3 \rightarrow 0.211\ SiH_8 + 0.263\ Fe_3Si$ | 5.33 | 0.09 | −0.024 | 0.41 |
| $MnCr_3$ | $0.605\ H_2 + 0.395\ MnCr_3 \rightarrow 0.014\ Mn_{29}H_2 + 1.184\ CrH$ | 1.53 | 0.33 | −0.049 | 0.83 |
| MnNi | $0.348\ H_2 + 0.652\ MnNi \rightarrow 0.652\ NiH + 0.022\ Mn_{29}H_2$ | 0.53 | 0.94 | −0.060 | 1.02 |

TABLE 5-continued

Information of the most stable decomposition reaction between each intermetallic compound in Table 1 and an abundant amount of $H_2$.

| Intermetallic compound | Equation of the most stable decomposition reaction with an abundant amount of $H_2$ | Molar fraction | PP8 | Reaction enthalpy (eV/atom) | PP9 |
|---|---|---|---|---|---|
| $Mn_2FeSi$ | $0.647\ H_2 + 0.353\ Mn_2FeSi \rightarrow 0.353\ FeH + 0.235\ Mn_3Si + 0.118\ SiH_8$ | 1.83 | 0.27 | −0.003 | 0.05 |
| $Mn_6Si_7Ni_{16}$ | No Reaction | N/A | 0.00 | N/A | 0.00 |
| MnSiNi | No Reaction | N/A | 0.00 | N/A | 0.00 |
| $MnFe_2Si$ | $0.786\ H_2 + 0.214\ MnFe_2Si \rightarrow 0.429\ FeH + 0.071\ Mn_3Si + 0.143\ SiH_8$ | 3.67 | 0.14 | −0.004 | 0.07 |
| $Mn_2CrSi$ | No Reaction | N/A | 0.00 | N/A | 0.00 |
| FeSiMo | $0.571\ H_2 + 0.429\ FeSiMo \rightarrow 0.143\ SiMo_3 + 0.143\ SiH_8 + 0.143\ Fe_3Si$ | 1.33 | 0.38 | −0.036 | 0.61 |
| $MnCrFe_2$ | $0.605\ H_2 + 0.395\ MnCrFe_2 \rightarrow 0.014\ Mn_{29}H_2 + 0.395\ CrH + 0.789\ FeH$ | 1.53 | 0.33 | −0.053 | 0.90 |
| $Mn_2SiMo$ | No Reaction | N/A | 0.00 | N/A | 0.00 |
| MnCrFeSi | $0.647\ H_2 + 0.353\ MnCrFeSi \rightarrow 0.118\ SiH_8 + 0.118\ Mn_3Si + 0.118\ Cr_3Si + 0.353\ FeH$ | 1.83 | 0.27 | −0.003 | 0.05 |

Based on the information provided in Tables 4 and 5, a sum of the penalty points (PPP) is calculated for each intermetallic compound, i.e. $\Sigma PP = PP5 + PP6 + PP7 + PP8 + PP9$. The sum of penalty points for Fe is 4.00 (i.e. $\Sigma PP_{Fe} = 4.00$). In one or more embodiments, to find intermetallic compounds that may exhibit comparably better resistance against hydrogen-related degradations (e.g. hydrogen embrittlement) than Fe, ΣPP is less than 4.00. Table 6 depicts a summary of exemplary candidates of intermetallic compounds that may be comparably more resistant to hydrogen-related degradations than Fe. Specifically, Table 6 categorizes the candidates of intermetallic compounds in three categories: (1) those with a ΣPP of less than 1.0 (i.e. $\Sigma PP < 1.0$); (2) those with a PP of greater than 1.0 but less than 2.0 (i.e. $1.0 < \Sigma PP < 2.0$); and (3) those with a ΣPP of greater than 2.0 but less than 4.0 (i.e. $2.0 < \Sigma PP < 4.0$).

TABLE 6

A summary of exemplary candidates of intermetallic compounds that may be comparably more resistant to $H_2$ than Fe.

| ΣPP value | Intermetallic compounds |
|---|---|
| $\Sigma PP < 1.0$ | $Cr_3Si$, $Mn_3Si$, $SiMo_3$, $SiNi_2$, $Mn_6Si_7Ni_{16}$, MnSiNi, $Si_{12}Ni_{31}$, $Fe_3Si$, $Si_3Mo_5$, $Mn_2FeSi$, FeSi, $Mn_2CrSi$ |
| $1.0 < \Sigma PP < 2.0$ | MnSi, $MnFe_2Si$, $Si_2Mo$, $Fe_{11}Si_5$, $Fe_2Si$, $MnNi_3$, $Mn_2SiMo$, $Fe_5Si_3$ |
| $2.0 < \Sigma PP < 4.0$ | $Mn_4Si_7$, $Ni_3Mo$, $FeNi_3$, $CrSi_2$, $FeSi_2$, $Fe_2Mo$, SiNi, MnCrFeSi, $Fe_7Mo_6$, $Ni_4Mo$, FeNi, FeSiMo, $Si_2Ni$, $CrNi_3$, $SiNi_3$ |
| $\Sigma PP_{Fe} = 4.0$ | Fe (reference) |

Results in Table 6 indicate that intermetallic compounds that include elements such as Cr, Mo, or Ni appear to exhibit comparably better resistance against hydrogen-related degradations than Fe. Therefore, increasing the amounts of Cr, Mo, and/or Ni, or triggering the formation of these intermetallic compounds (e.g. by changing element compositions or through heat treatments) within a metal substrate, such as stainless steel, may enhance the resistance of the metal substrate against hydrogen-related degradation.

Table 7 depicts information regarding the reactivities of metal hydrides against $H_2$. The metal hydrides include NiH, FeH, MnH, CrH, and MoH, which originate from the elements in stainless steel. Among them, NiH, FeH, and MnH are stable at a temperature of around 0 K. CrH is stable at temperatures between around 1 K and up to around 130° C. MoH is stable at temperatures between around 130° C. and up to around 250° C. As shown in Table 7, NiH, FeH, MnH, CrH, and MoH do not react with $H_2$. The formation of these metal hydrides may not adversely influence the electrical conductivity of stainless steel because they are metallic (i.e. $E_g$, bandgap=0 eV). However, the existence of these metal hydrides may make the stainless steel more brittle.

Table 7 also indicates that after forming SiH, SiH may further react with $H_2$ to form $SiH_8$. The reaction enthalpy of the reaction is about −0.107 eV/atom. However, because both SiH and $SiH_8$ are insulating ($E_g$, bandgap >2 eV), the formation of either SiH or $SiH_8$ on stainless steel is not favorable.

TABLE 7

Information regarding the reactivities of metal hydrides against $H_2$.

| Metal hydrides | Stable when temperature is | Most stable reaction with $H_2$ | Reaction enthalpy (eV/atom) |
|---|---|---|---|
| NiH | At 0 K | No reaction | N/A |
| FeH | | No reaction | N/A |
| MnH | | No reaction | N/A |
| CrH | Between 1 K to 130° C. | No reaction | N/A |
| SiH | | $0.778\ H_2 + 0.222\ SiH \longrightarrow 0.222\ SiH_8$ | −0.107 |
| MoH | Between 130 to 250° C. | No reaction | N/A |

Next, the chemical reactivities of binary and ternary carbides against $H_2$ are discussed. Similarly, the data-driven materials screening method may be used to evaluate the reactivities of carbides against $H_2$ in order to identify carbides that are comparably resistant to hydrogen-related degradations (e.g. hydrogen embrittlement) and that are suitable to be used as protective coating materials to protect components in electrochemical devices, such as in a fuel cell or electrolyzer system, from hydrogen-related degradations.

Table 8 lists binary and ternary carbides whose reactivities against $H_2$ are studied using the data-driven materials screening method. Table 8 categorizes the carbides based on their temperature stabilities. For example, binary carbides that are stable at a temperature of around 0 K include $Cr_{23}C_6$, $Cr_7C_3$, $Mn_{23}C_6$, $Cr_3C_2$, $Mo_2C$, SiC, and MoC. Binary carbides that are stable at temperatures between around 1 K and up to around 130° C. include $Cr_3C$, $Mn_3C$, $Mn_5C_2$, and $Mn_7C_3$. Binary carbides that are stable at temperatures between around 130° C. and up to around 250° C. include $Fe_{23}C_6$. Further, ternary carbides that are stable at a temperature of around 0 K include $Ni_6Mo_6C$, $Ni_2Mo_4C$, $Mn_3Mo_3C$, and $Cr_{21}Mo_2C_6$. Ternary carbides that are stable at temperatures between around 1 K and up to around 130° C. include $Fe_3Mo_3C$. Ternary carbides that are stable at temperatures between around 130° C. and up to around 250° C. include $Si_3Mo_5C$ and $Mn_5SiC$.

TABLE 8

Binary and ternary carbides whose reactivities against $H_2$ are studied using the data-driven materials screening method.

| Category | Stable when temperature is | Compounds |
|---|---|---|
| Binary carbides | At 0 K | $Cr_{23}C_6$, $Cr_7C_3$, $Mn_{23}C_6$, $Cr_3C_2$, $Mo_2C$, SiC, MoC |
| | Between 1 K and 130° C. | $Cr_3C$, $Mn_3C$, $Mn_5C_2$, $Mn_7C_3$ |
| | Between 130° C. and 250° C. | $Fe_{23}C_6$ |
| Ternary carbides | At 0 K | $Ni_6Mo_6C$, $Ni_2Mo_4C$, $Mn_3Mo_3C$, $Cr_{21}Mo_2C_6$ |
| | Between 1 K and 130° C. | $Fe_3Mo_3C$ |
| | Between 130° C. and 250° C. | $Si_3Mo_5C$, $Mn_5SiC$ |

Table 9 depicts information of a first stable decomposition reaction between each carbide in Table 8 and a dilute amount of $H_2$. Table 9 provides a reaction equation, if possible, of the first stable decomposition reaction and a reaction enthalpy of each reaction. To take the stability of the carbides into consideration, a penalty point (e.g. PP10) is assigned to each carbide. The carbides that are stable at a temperature of around 0 K are assigned a PP10 of 0. Further, the carbides that are stable at temperatures between around 1 K and up to around 130° C. are assigned a PP10 of 1. In addition, the carbides that are stable at temperatures between around 130° C. and up to around 250° C. are assigned a PP10 of 2.

Table 9 also provides a molar fraction between the dilute amount of $H_2$ and each carbide. Further, Table 9 provides another penalty point (e.g. PP11) regarding the molar fraction, where PP11 of 1.00 is assigned to the reference reaction between Fe and the dilute amount of $H_2$ (i.e. 0.50, as listed in Table 2). PP11 is calculated by dividing the molar fraction between the dilute amount of $H_2$ and Fe by the molar fraction between the dilute amount of $H_2$ and each carbide. For example, since the molar fraction between the dilute amount of $H_2$ and $Cr_{23}C_6$ is 11.99, PP11 thus equals 0.50/11.99, which is around 0.04.

Table 9 further provides a reaction enthalpy (eV/atom) of the reaction between the dilute amount of $H_2$ and each carbide. Table 9 also provides another penalty point (e.g. PP12) regarding the reaction enthalpy of the reaction, where PP12 of 1.00 is assigned to the reference reaction between Fe and the dilute amount of $H_2$ (i.e. −0.059 eV/atom, as listed in Table 2). PP12 is calculated by dividing the reaction enthalpy between the dilute amount of $H_2$ and each carbide by that between the dilute amount of $H_2$ and Fe. For example, since the reaction enthalpy between the dilute amount of $H_2$ and $Cr_{23}C_6$ is −0.168, PP12 thus equals −0.168/−0.059, which is about 2.85.

TABLE 9

Information of a first stable decomposition reaction between each carbide in Table 8 and a dilute amount of $H_2$.

| Carbides | PP10 | Equation of a first stable decomposition reaction with a dilute amount of $H_2$ | Molar fraction | PP11 | Reaction enthalpy (eV/atom) | PP12 |
|---|---|---|---|---|---|---|
| Fe (reference) | N/A | $0.333\ H_2 + 0.667\ Fe \rightarrow 0.667\ FeH$ | 0.50 | 1.00 | −0.059 | 1.00 |
| $Cr_{23}C_6$ | 0 | $0.923\ H_2 + 0.077\ Cr_{23}C_6 \rightarrow 0.462\ H_4C + 1.769\ Cr$ | 11.99 | 0.04 | −0.168 | 2.85 |
| $Cr_7C_3$ | 0 | $0.701\ H_2 + 0.299\ Cr_7C_3 \rightarrow 0.091\ Cr_{23}C_6 + 0.351\ H_4C$ | 2.34 | 0.21 | −0.123 | 2.08 |
| $Mn_{23}C_6$ | 0 | $0.927\ H_2 + 0.072\ Mn_{23}C_6 \rightarrow 0.435\ H_4C + 0.057\ Mn_{29}H_2$ | 12.88 | 0.04 | −0.174 | 2.95 |
| $Cr_3C$ | 1 | $0.303\ H_2 + 0.697\ Cr_{23}C_6 \rightarrow 0.091\ Cr_{23}C_6 + 0.152\ H_4C$ | 0.43 | 1.15 | −0.080 | 1.36 |
| $Mn_3C$ | 1 | $0.303\ H_2 + 0.697\ Mn_3C \rightarrow 0.091\ Mn_{23}C_6 + 0.152\ H_4C$ | 0.43 | 1.15 | −0.084 | 1.42 |
| $Cr_3C_2$ | 0 | $0.588\ H_2 + 0.412\ Cr_3C_2 \rightarrow 0.176\ Cr_7C_3 + 0.294\ H_4C$ | 1.18 | 0.42 | −0.164 | 2.78 |
| $Mn_5C_2$ | 1 | $0.582\ H_2 + 0.418\ Mn_5C_2 \rightarrow 0.091\ Mn_{23}C_6 + 0.291\ H_4C$ | 1.15 | 0.43 | −0.144 | 2.44 |
| $Mn_7C_3$ | 1 | $0.701\ H_2 + 0.299\ Mn_7C_3 \rightarrow 0.091\ Mn_{23}C_6 + 0.351\ H_4C$ | 2.34 | 0.21 | −0.157 | 2.66 |
| $Mo_2C$ | 0 | $0.667\ H_2 + 0.333\ Mo_2C \rightarrow 0.333\ H_4C + 0.667\ Mo$ | 2.00 | 0.25 | −0.225 | 3.81 |
| $Fe_{23}C_6$ | 2 | $0.923\ H_2 + 0.077\ Fe_{23}C_6 \rightarrow 0.462\ H_4C + 1.769\ Fe$ | 11.99 | 0.04 | −0.213 | 3.6 |
| SiC | 0 | $0.667\ H_2 + 0.333\ SiC \rightarrow 0.333\ H_4C + 0.333\ Si$ | 2.00 | 0.25 | −0.246 | 4.17 |
| MoC | 0 | $0.5\ H_2 + 0.5\ MoC \rightarrow 0.25\ Mo_2C + 0.25\ H_4C$ | 1.00 | 0.50 | −0.237 | 4.02 |
| $Ni_6Mo_6C$ | 0 | $0.667\ H_2 + 0.333\ Ni_6Mo_6C \rightarrow 0.667\ Ni_3Mo + 0.333\ H_4C + 0.857\ Mo$ | 2.00 | 0.25 | −0.088 | 1.49 |
| $Ni_2Mo_4C$ | 0 | $0.571\ H_2 + 0.429\ Ni_2Mo_4C \rightarrow 0.143\ Ni_6Mo_6C + 0.286\ H_4C + 0.857\ Mo$ | 1.33 | 0.38 | −0.105 | 1.78 |
| $Mn_3Mo_3C$ | 0 | $0.678\ H_2 + 0.322\ Mn_3MO_3C \rightarrow 0.322\ H_4C + 0.033\ Mn_{29}H_2 + 0.967\ Mo$ | 2.11 | 0.24 | −0.130 | 2.20 |
| $Cr_{21}Mo_2C_6$ | 0 | $0.923\ H_2 + 0.077\ Cr_{21}(MoC_3)_2 \rightarrow 0.462\ H_4C + 1.615\ Cr + 0.154\ Mo$ | 11.99 | 0.04 | −0.160 | 2.7 |
| $Fe_3Mo_3C$ | 1 | $0.667\ H_2 + 0.333\ Fe_3Mo_3C \rightarrow 0.333\ H_4C + Mo + Fe$ | 2.00 | 0.25 | −0.150 | 2.54 |
| $Si_3Mo_5C$ | 2 | $0.667\ H_2 + 0.333\ Si_3Mo_5C \rightarrow 0.333\ H_4C + 0.333\ Si_3Mo_5$ | 2.00 | 0.25 | −0.145 | 2.46 |
| $Mn_5SiC$ | 2 | $0.489\ H_2 + 0.511\ Mn_5SiC \rightarrow 0.044\ Mn_{23}C_6 + 0.244\ H_4C + 0.511\ Mn_3Si$ | 0.96 | 0.52 | −0.132 | 2.24 |

Table 10 depicts information of the most stable decomposition reaction between each carbide in Table 8 and an abundant amount of $H_2$. Particularly, Table 10 provides a reaction equation, if possible, of the most stable decomposition reaction and a reaction enthalpy of each reaction. Table 10 also provides a molar fraction between the abundant amount of $H_2$ and each carbide. Further, Table 10 provides a penalty point (e.g. PP13) regarding the molar fraction, where PP13 of 1.00 is assigned to the reference reaction between Fe and the abundant amount of $H_2$ (i.e. the molar fraction is 0.50, as listed in Table 3). PP13 is calculated by dividing the molar fraction between the abundant amount of $H_2$ and Fe by the molar fraction between the abundant amount of $H_2$ and each carbide. For example, since the molar fraction between the abundant amount of $H_2$ and $Cr_{23}C_6$ is 11.99, PP13 thus equals 0.50/11.99, which is around 0.04.

Table 10 further provides a reaction enthalpy (eV/atom) of the reaction between the abundant amount of $H_2$ and each carbide. Table 10 also provides another penalty point (e.g. PP14) regarding the reaction enthalpy of the reaction, where PP14 of 1.00 is assigned to the reference reaction between Fe and the abundant amount of $H_2$ (i.e. −0.059 eV/atom, as listed in Table 3). PP14 is calculated by dividing the reaction enthalpy between the abundant amount of $H_2$ and each carbide by that between the abundant amount of $H_2$ and Fe. For example, since the reaction enthalpy between the abundant amount of $H_2$ and $Cr_{23}C_6$ is −0.168, PP14 thus equals −0.168/−0.059, which is about 2.85.

TABLE 10

Information of the most stable decomposition reaction between each carbide in Table 8 and an abundant amount of $H_2$.

| Carbides | Equation of the most stable decomposition reaction with an abundant amount of $H_2$ | Molar fraction | PP13 | Reaction enthalpy (eV/atom) | PP14 |
|---|---|---|---|---|---|
| Fe (reference) | $0.333\ H_2 + 0.667\ Fe \rightarrow 0.667\ FeH$ | 0.50 | 1.00 | −0.059 | 1.00 |
| $Cr_{23}C_6$ | $0.923\ H_2 + 0.077\ Cr_{23}C_6 \rightarrow 0.462\ H_4C + 1.769$ | 11.99 | 0.04 | −0.168 | 2.85 |
| $Cr_7C_3$ | $0.857\ H_2 + 0.143\ Cr_7C_3 \rightarrow 0.429\ H_4C + Cr$ | 5.99 | 0.08 | −0.205 | 3.47 |
| $Mn_{23}C_6$ | $0.927\ H_2 + 0.072\ Mn_{23}C_6 \rightarrow 0.435\ H_4C + 0.057\ Mn_9H_2$ | 12.88 | 0.04 | −0.174 | 2.95 |
| $Cr_3C$ | $0.667\ H_2 + 0.333\ Cr_3C \rightarrow 0.333\ H_4C + Cr$ | 2.00 | 0.25 | −0.194 | 3.29 |
| $Mn_3C$ | $0.678\ H_2 + 0.322\ Mn_3C \rightarrow 0.322\ H_4C + 0.033\ Mn_{29}H_2$ | 2.11 | 0.24 | −0.201 | 3.41 |
| $Cr_3C_2$ | $0.8\ H_2 + 0.2\ Cr_3C_2 \rightarrow 0.4\ H_4C + 0.6\ Cr$ | 4.00 | 0.13 | −0.248 | 4.20 |
| $Mn_5C_2$ | $0.807\ H_2 + 0.193\ Mn_5C_2 \rightarrow 0.387\ H_4C + 0.033\ Mn_{29}H_2$ | 4.18 | 0.12 | −0.226 | 3.83 |
| $Mn_7C_3$ | $0.862\ H_2 + 0.138\ Mn_7C_3 \rightarrow 0.414\ H_4C + 0.033\ Mn_{29}H_2$ | 6.25 | 0.08 | −0.231 | 3.92 |
| $Mo_2C$ | $0.667\ H_2 + 0.333\ Mo_2C \rightarrow 0.333\ H_4C + 0.667\ Mo$ | 2.00 | 0.25 | −0.225 | 3.81 |
| $Fe_{23}C_6$ | $0.959\ H_2 + 0.041\ Fe23C_6 \rightarrow 0.939\ FeH + 0.245\ H_4C$ | 23.39 | 0.02 | −0.185 | 3.14 |
| SiC | $0.667\ H_2 + 0.333\ SiC \rightarrow 0.333\ H_4C + 0.333\ Si$ | 2.00 | 0.25 | −0.246 | 4.17 |
| MoC | $0.667\ H_2 + 0.333\ MoC \rightarrow 0.333\ H_4C + 0.333\ Mo$ | 2.00 | 0.25 | −0.289 | 4.90 |
| $Ni_6Mo_6C$ | $0.833\ H_2 + 0.167\ Ni_6Mo_6C \rightarrow 0.167\ H_4C + NiH + Mo$ | 4.99 | 0.10 | −0.092 | 1.56 |
| $Ni_2Mo_4C$ | $0.667\ H_2 + 0.333\ Ni_2Mo_4C \rightarrow 0.222\ Ni_3Mo + 0.333\ H_4C + 1.111\ Mo$ | 2.00 | 0.25 | −0.138 | 2.34 |
| $Mn_3Mo_3C$ | $0.678\ H_2 + 0.322\ Mn_3Mo_3C \rightarrow 0.322\ H_4C + 0.033\ Mn_9H_2 + 0.967\ Mo$ | 2.11 | 0.24 | −0.130 | 2.20 |
| $Cr_{21}Mo_2C_6$ | $0.923\ H_2 + 0.077\ Cr_{21}(MoC_3)_2 \rightarrow 0.462\ H_4C + 1.615\ Cr + 0.154\ Mo$ | 11.99 | 0.04 | −0.160 | 2.71 |
| $Fe_3Mo_3C$ | $0.667\ H_2 + 0.333\ Fe_3Mo_3C \rightarrow 0.333\ H_4C + Mo + Fe$ | 2.00 | 0.25 | −0.150 | 2.54 |
| $Si_3Mo_5C$ | $0.667\ H_2 + 0.333\ Si_3Mo_5C \rightarrow 0.333\ H_4C + 0.333\ Si_3Mo_5$ | 2.00 | 0.25 | −0.145 | 2.46 |
| $Mn_5SiC$ | $0.674\ H_2 + 0.326\ Mn_5SiC \rightarrow 0.022\ Mn_{29}H_2 + 0.326\ H_4C + 0.326\ Mn_3Si$ | 2.07 | 0.24 | −0.180 | 3.05 |

Based on the information provided in Tables 9 and 10, a sum of the penalty points (ΣPP') is calculated for each carbide, i.e. ΣPP'=PP10+PP11+PP12+PP13+PP14. The sum of penalty points for Fe is 4.00 (i.e. $\Sigma PP_{Fe}$=4.00). Table 11 provides a summary of exemplary candidates of carbides that may exhibit comparably better resistance to Hz when compared to Fe. Table 11 provides the molecular weight (MW) of each carbide, a sum of penalty points (ΣPP') for each carbide, and a sum of penalty points of each carbide per MW (ΣPP' per MW). As shown in Table 11, the sum of penalty points of Fe per MW is about 71.62 per mg. The candidates of carbides listed in Table 11 all have a ΣPP' per MVW lower than that of Fe.

TABLE 11

A summary of exemplary candidates of carbides that may exhibit comparably better resistance to $H_2$ when compared to Fe.

| Compounds | MW (g/mol) | ΣPP' | ΣPP' per MW (mg) |
|---|---|---|---|
| Fe (reference) | 55.85 | 4.00 | 71.62 |
| $Ni_6Mo_6C$ | 939.81 | 3.40 | 3.62 |
| $Cr_{21}Mo_2C_6$ | 1355.86 | 5.51 | 4.06 |
| $Mn_{23}C_6$ | 1335.64 | 5.98 | 4.47 |
| $Cr_{23}C_6$ | 1267.97 | 5.78 | 4.56 |
| $Fe_{23}C_6$ | 1356.50 | 8.81 | 6.49 |
| $Ni_2Mo_4C$ | 513.16 | 4.74 | 9.25 |
| $Mn_3Mo_3C$ | 464.64 | 4.88 | 10.51 |
| $Si_3Mo_5C$ | 575.97 | 7.42 | 12.87 |
| $Fe_3Mo_3C$ | 467.37 | 6.58 | 14.09 |
| $Cr_7C_3$ | 400.00 | 5.86 | 14.64 |
| $Mn_7C_3$ | 420.60 | 7.87 | 18.71 |
| $Mn_5SiC$ | 314.79 | 8.05 | 25.58 |
| $Mn_5C_2$ | 298.71 | 7.82 | 26.19 |
| $Mo_2C$ | 203.89 | 8.13 | 39.86 |
| $Mn_3C$ | 176.82 | 7.22 | 40.82 |
| $Cr_3C_2$ | 180.01 | 7.53 | 41.83 |
| $Cr_3C$ | 168.00 | 7.04 | 41.93 |

Apart from intermetallic compounds and carbides, MAX phase compounds may also exhibit resistance against $H_2$ and be suitable to be used as protective coating materials to protect components in electrochemical devices, such as in a fuel cell or electrolyzer system, from hydrogen-related degradations (e.g. hydrogen embrittlement). MAX phase compounds are layered hexagonal carbides or nitrides with a general formula of $M_{n+1}AX_n$, where n=1 to 4, M is an early transition metal, A is an A-group element (e.g. IIIA, IVA, group 13, or group 14 element), and X is either C or N.

The reactivities of MAX phase compounds against $H_2$ may be evaluated using the data-driven materials screening method. Non-limiting examples of MAX phase compounds whose reactivities against $H_2$ are examined using the data-driven materials screening method include $Zr_2SnC$, $Nb_2SnC$, $Ti_3SnC_2$, $V_2PC$, $Nb_2AlC$, $Nb_2PC$, $Ti_3AlC_2$, $Ti_3SiC_2$, $Ti_2SnC$, $Zr_2SC$, $Ti_2SC$, $Nb_4AlC_3$, and $Ti_4AlN_3$.

Table 12 depicts information of a first stable decomposition reaction between each MAX phase compound and a dilute amount of $H_2$. Table 12 provides a reaction equation, if possible, of the first stable decomposition reaction and a reaction enthalpy of each reaction. Table 12 also provides a molar fraction between the dilute amount of $H_2$ and each MAX phase compound. Further, Table 12 provides a penalty point (e.g. PP15) regarding the molar fraction, where PP15 of 1.00 is assigned to the reference reaction between Fe and the dilute amount of $H_2$ (i.e. 0.50, as listed in Table 2). PP15 is calculated by dividing the molar fraction between the dilute amount of $H_2$ and Fe by the molar fraction between the dilute amount of $H_2$ and each MAX phase compound. For example, since the molar fraction between the dilute amount of $H_2$ and $Zr_2SnC$ is 4.00, PP11 thus equals 0.50/4.00, which is around 0.13.

Table 12 further provides a reaction enthalpy (eV/atom) of the reaction between the dilute amount of $H_2$ and each MAX phase compound. Table 12 also provides another penalty point (e.g. PP16) regarding the reaction enthalpy of the reaction, where PP16 of 1.00 is assigned to the reference reaction between Fe and the dilute amount of $H_2$ (i.e. −0.059 eV/atom, as listed in Table 2). PP16 is calculated by dividing the reaction enthalpy between the dilute amount of $H_2$ and each MAX phase compound by that between the dilute amount of $H_2$ and Fe. For example, since the reaction enthalpy between the dilute amount of $H_2$ and $Zr_2SnC$ is −0.222, PP15 thus equals −0.222/−0.059, which is about 3.76.

TABLE 12

Information of a first stable decomposition reaction between each MAX phase compound and a dilute amount of $H_2$.

| MAX phase compound | Equation of a first stable decomposition reaction with a dilute amount of $H_2$ | Molar fraction | PP15 | Reaction enthalpy (eV/atom) | PP16 |
|---|---|---|---|---|---|
| Fe (reference) | $0.333\ H_2 + 0.667\ Fe \rightarrow 0.667\ FeH$ | 0.50 | 1.00 | −0.059 | 1.00 |
| $Zr_2SnC$ | $0.8\ H_2 + 0.2\ Zr_2SnC \rightarrow 0.4\ ZrH_2 + 0.2\ H_4C + 0.2\ Sn$ | 4.00 | 0.13 | −0.222 | 3.76 |
| $Nb_2SnC$ | $0.8\ H_2 + 0.2\ Nb_2SnC \rightarrow 0.4\ NbH_2 + 0.2\ H_4C + 0.2\ Sn$ | 4.00 | 0.13 | −0.180 | 3.05 |
| $Ti_3SnC_2$ | $0.875\ H_2 + 0.125\ Ti_3SnC_2 \rightarrow .0375\ TiH_2 + 0.25\ H_4C + 0.125\ Sn$ | 7.00 | 0.07 | −0.217 | 3.68 |
| $V_2PC$ | $0.5\ H_2 + 0.5\ V_2PC \rightarrow 0.25\ V_4P_2C + 0.25\ H_4C$ | 1.00 | 0.50 | −0.150 | 2.54 |
| $Nb_2AlC$ | $0.786\ H_2 + 0.214\ Nb_2AlC \rightarrow 0.214\ H_4C + 0.071\ NbAl_3 + 0.357\ NbH_2$ | 3.67 | 0.14 | −0.181 | 3.07 |
| $Nb_2PC$ | $0.25\ H_2 + 0.75\ Nb_2PC \rightarrow 0.125\ H_4C + 0.125\ Nb_6C_5 + 0.75\ NbP$ | 0.33 | 1.50 | −0.063 | 1.07 |
| $Ti_3AlC_2$ | $0.87\ H_2 + 0.13\ Ti_3AlC_2 \rightarrow 0.043\ TiAl_3 + 0.348\ TiH_2 + 0.286\ TiH_2$ | 6.69 | 0.07 | −0.227 | 3.85 |
| $Ti_3SiC_2$ | $0.857\ H_2 + 0.143\ Ti_3SiC_2 \rightarrow 0.286\ H_4C + 0.143\ TiSi + 0.286\ TiH_2$ | 5.99 | 0.08 | −0.216 | 3.66 |

TABLE 12-continued

Information of a first stable decomposition reaction between each MAX phase compound and a dilute amount of $H_2$.

| MAX phase compound | Equation of a first stable decomposition reaction with a dilute amount of $H_2$ | Molar fraction | PP15 | Reaction enthalpy (eV/atom) | PP16 |
|---|---|---|---|---|---|
| $Ti_2SnC$ | $0.333\ H_2 + 0.667\ Ti_2SnC \rightarrow 0.333\ Ti_3SnC_2 + 0.333\ TiH_2 + 0.333\ Sn$ | 0.50 | 1.00 | −0.067 | 1.14 |
| $Zr_2SC$ | $0.765\ H_2 + 0.235\ Zr_2CS \rightarrow 0.235\ H_4C + 0.294\ ZrH_2 + 0.059\ Zr_3S_4$ | 3.26 | 0.15 | −0.165 | 2.80 |
| $Ti_2SC$ | $0.75\ H_2 + 0.25\ Ti_2CS \rightarrow 0.25\ H_4C + 0.25\ TiH_2 + 0.25\ TiS$ | 3.00 | 0.17 | −0.157 | 2.66 |
| $Nb_4AlC_3$ | $0.25\ H_2 + 0.75\ Nb_4AlC_3 \rightarrow 0.75\ Nb_3AlC_2 + 0.125\ Nb_6C_5 + 0.125\ H_4C$ | 0.33 | 1.50 | −0.035 | 0.59 |
| $Ti_4AlN_3$ | $0.667\ H_2 + 0.333\ Ti_4AlN_3 \rightarrow 0.667\ TiH_2 + 0.333\ AlN + 0.667\ TiN$ | 2.00 | 0.25 | −0.123 | 2.08 |

Table 13 depicts information of the most stable decomposition reaction between each MAX phase compound and an abundant amount of $H_2$. Particularly, Table 13 provides a reaction equation, if possible, of the most stable decomposition reaction and a reaction enthalpy of each reaction. Table 13 also provides a molar fraction between the abundant amount of $H_2$ and each MAX phase compound. Further, Table 13 provides a penalty point (e.g. PP17) regarding the molar fraction, where PP17 of 1.00 is assigned to the reference reaction between Fe and the abundant amount of $H_2$ (i.e. the molar fraction is 0.50, as listed in Table 3). PP17 is calculated by dividing the molar fraction between the abundant amount of $H_2$ and Fe by the molar fraction between the abundant amount of $H_2$ and each MAX phase compound. For example, since the molar fraction between the abundant amount of $H_2$ and $Zr_2SnC$ is 4.00, PP17 thus equals 0.50/4.00, which is around 0.13.

Table 13 further provides a reaction enthalpy (eV/atom) of the reaction between the abundant amount of $H_2$ and each MAX phase compound. Table 13 also provides another penalty point (e.g. PP18) regarding the reaction enthalpy of the reaction, where PP18 of 1.00 is assigned to the reference reaction between Fe and the abundant amount of $H_2$ (i.e. −0.059 eV/atom, as listed in Table 3). PP18 is calculated by dividing the reaction enthalpy between the abundant amount of $H_2$ and each MAX phase compound by that between the abundant amount of $H_2$ and Fe. For example, since the reaction enthalpy between the abundant amount of $H_2$ and $Zr_2SnC$ is −0.222, PP18 thus equals −0.222/−0.059, which is about 3.76.

TABLE 13

Information of the most stable decomposition reaction between each MAX phase compound and an abundant amount of $H_2$.

| MAX phase compound | Equation of the most stable decomposition reaction with an abundant amount of $H_2$ | Molar fraction | PP17 | Reaction enthalpy (eV/atom) | PP18 |
|---|---|---|---|---|---|
| Fe (reference) | $0.333\ H_2 + 0.667\ Fe \rightarrow 0.667\ FeH$ | 0.50 | 1.00 | −0.059 | 1.00 |
| $Zr_2SnC$ | $0.8\ H_2 + 0.2\ Zr_2SnC \rightarrow 0.4\ ZrH_2 + 0.2\ H_4C + 0.2\ Sn$ | 4.00 | 0.13 | −0.222 | 3.76 |
| $Nb_2SnC$ | $0.8\ H_2 + 0.2\ Nb_2SnC \rightarrow 0.4\ NbH_2 + 0.2\ H_4C + 0.2\ Sn$ | 4.00 | 0.13 | −0.180 | 3.05 |
| $Ti_3SnC_2$ | $0.875\ H_2 + 0.125\ Ti_3SnC_2 \rightarrow 0.375\ TiH_2 + 0.25\ H_4C + 0.125\ Sn$ | 7.00 | 0.07 | −0.217 | 3.68 |
| $V_2PC$ | $0.696\ H_2 + 0.304\ V_2PC \rightarrow 0.043\ V_{12}P_7 + 0.087\ VH_2 + 0.304\ H_4C$ | 2.29 | 0.22 | −0.195 | 3.31 |
| $Nb_2AlC$ | $0.786\ H_2 + 0.214\ Nb_2AlC \rightarrow 0.214\ H_4C + 0.071\ NbAl_3 + 0.357\ NbH_2$ | 3.67 | 0.14 | −0.181 | 3.07 |
| $Nb_2PC$ | $0.75\ H_2 + 0.25\ Nb_2PC \rightarrow 0.25\ H_4C + 0.25\ NbH_2 + 0.25\ NbP$ | 3.00 | 0.17 | −0.183 | 3.10 |
| $Ti_3AlC_2$ | $0.87\ H_2 + 0.13\ Ti_3AlC_2 \rightarrow 0.043\ TiAl_3 + 0.348\ TiH_2 + 0.261\ H_4C$ | 6.69 | 0.07 | −0.227 | 3.85 |

TABLE 13-continued

Information of the most stable decomposition reaction between each MAX phase compound and an abundant amount of $H_2$.

| MAX phase compound | Equation of the most stable decomposition reaction with an abundant amount of $H_2$ | Molar fraction | PP17 | Reaction enthalpy (eV/atom) | PP18 |
|---|---|---|---|---|---|
| $Ti_3SiC_2$ | $0.857\ H_2 + 0.143\ Ti_3SiC_2 \rightarrow 0.286\ H_4C + 0.143\ TiSi + 0.286\ TiH_2$ | 5.99 | 0.08 | −0.216 | 3.66 |
| $Ti_2SnC$ | $0.8\ H_2 + 0.2\ Ti_2SnC \rightarrow 0.4\ TiH_2 + 0.2\ H_4C + 0.2\ Sn$ | 4.00 | 0.13 | −0.209 | 3.54 |
| $Zr_2SC$ | $0.765\ H_2 + 0.235\ Zr_2CS \rightarrow 0.235\ H_4C + 0.294\ ZrH_2 + 0.059\ Zr_3S_4$ | 3.26 | 0.15 | −0.165 | 2.80 |
| $Ti_2SC$ | $0.75\ H_2 + 0.25\ Ti_2CS \rightarrow 0.25\ H_4C + 0.25\ TiH_2 + 0.25\ TiS$ | 3.00 | 0.17 | −0.157 | 2.66 |
| $Nb_4AlC_3$ | $0.906\ H_2 + 0.094\ Nb_4AlC_3 \rightarrow 0.281\ H_4C + 0.031\ NbAl_3 + 0.344\ NbH_2$ | 9.64 | 0.05 | −0.205 | 3.47 |
| $Ti_4AlN_3$ | $0.667\ H_2 + 0.333\ Ti_4AlN_3 \rightarrow 0.667\ TiH_2 + 0.333\ AlN + 0.667\ TiN$ | 2.00 | 0.25 | −0.123 | 2.08 |

Based on the information provided in Tables 12 and 13, a sum of the penalty points (ΣPP") is calculated for each MAX phase compound, i.e. ΣPP"=PP15+PP16+PP17+PP18. The sum of penalty points for Fe is 4.00 (i.e. $\Sigma PP_{Fe}$=4.00). Table 14 provides a summary of exemplary candidates of MAX phase compounds that may exhibit comparably better resistance against Hz when compared to Fe. Table 14 also provides a sum of penalty points (ΣPP") of each MAX phase compound.

Table 14 further provides the molecular weight (MW) of each MAX phase compound, a sum of penalty points of each MAX phase compound per MW (ΣPP" per MW), and a percentage of improvement of each MAX phase compound when compared to Fe based on the ΣPP" per MW. It is noted that $\Sigma PP_{Fe}$ per MW is around 0.072. To calculate the percentage of improvement of each MAX phase compound when compared to Fe based on the ΣPP" per MW, $\Sigma PP_{Fe}$ per MW is divided by the ΣPP" per MW of each MAX phase compound. For example, since the ΣPP" per MW for $Nb_4AlC_3$ is around 0.013, the percentage of improvement of $Nb_4AlC_3$ when compared to Fe thus equals 0.072/0.013, which is around 554.0%.

Table 14 also provides the density of each MAX phase compound, a sum of penalty points of each MAX phase compound per volume (ΣPP" per volume), and a percentage of improvement of each MAX phase compound when compared to Fe based on the ΣPP" per volume. $\Sigma PP_{Fe}$ per volume equals ($\Sigma PP_{Fe}$ per MW)*(the density of Fe), i.e. 0.072*8.03, which is around 0.575. To calculate the percentage of improvement of each MAX phase compound when compared to Fe based on the ΣPP" per volume, $\Sigma PP_{Fe}$ per volume is divided by the ΣPP" per volume of each MAX phase compound. For example, since the ΣPP" per volume for $Nb_4AlC_3$ is around 0.089, the percentage of improvement of $Nb_4AlC_3$ when compared to Fe thus equals 0.575/0.089, which is around 649.3%.

In addition, Table 14 provides a total percentage of improvement of each MAX phase compound when compared to Fe, which represents a sum of the percentage of improvement of each MAX phase compound when compared to Fe based on the ΣPP" per MW plus the percentage of improvement of each MAX phase compound when compared to Fe based on the ΣPP" per volume. For comparison, the percentage of improvement of Fe based on $\Sigma PP_{Fe}$ per MW is assigned as 100%, and the percentage of improvement of Fe based on $\Sigma PP_{Fe}$ per volume is also assigned as 100%. As shown in Table 14, all the MAX phase compounds exhibit a total percentage of improvement greater than 100%. This indicates that the MAX phase compounds in Table 14 may exhibit comparably better resistance against $H_2$ when compared to Fe, thus suitable to be used as protective coating materials to protect metal components from hydrogen-related degradations (e.g. hydrogen embrittlement).

TABLE 14

A summary of exemplary candidates of MAX phase compounds that may exhibit comparably better resistance against $H_2$ when compared to Fe.

| MAX Phase | MW (g/mol) | Density (g/cm$^3$) | ΣPP" | ΣPP" per MW (g) | ΣPP" per volume (cm$^3$) | % of improvement per MW (g) | % of improvement per volume (cm$^3$) | Total % of improvement |
|---|---|---|---|---|---|---|---|---|
| Fe (reference) | 55.85 | 8.03 | 4.000 | 0.072 | 0.575 | 100.0% | 100.0% | 200.0% |
| $Nb_4AlC_3$ | 434.64 | 6.85 | 5.620 | 0.013 | 0.089 | 554.0% | 649.3% | 1203.3% |
| $Ti_4AlN_3$ | 260.47 | 4.74 | 4.669 | 0.018 | 0.085 | 399.5% | 676.7% | 1076.2% |
| $Nb_2SnC$ | 316.53 | 8.13 | 6.352 | 0.020 | 0.163 | 356.9% | 352.6% | 709.5% |
| $Ti_3SnC_2$ | 286.33 | 5.91 | 7.499 | 0.026 | 0.155 | 273.5% | 371.7% | 645.2% |
| $Zr_2SC$ | 226.52 | 6.01 | 5.900 | 0.026 | 0.157 | 275.0% | 367.1% | 642.0% |
| $Ti_2SnC$ | 226.45 | 6.25 | 5.803 | 0.026 | 0.160 | 279.5% | 359.3% | 638.8% |
| $Zr_2SnC$ | 313.17 | 7.12 | 7.775 | 0.025 | 0.177 | 288.5% | 325.1% | 613.6% |
| $Nb_2PC$ | 228.80 | 6.87 | 5.836 | 0.026 | 0.175 | 280.8% | 328.0% | 608.8% |
| $Nb_2AlC$ | 224.81 | 6.30 | 6.408 | 0.029 | 0.179 | 251.3% | 320.5% | 571.8% |

TABLE 14-continued

A summary of exemplary candidates of MAX phase compounds that may exhibit comparably better resistance against $H_2$ when compared to Fe.

| MAX Phase | MW (g/mol) | Density ($g/cm^3$) | ΣPP" | ΣPP" per MW (g) | ΣPP" per volume ($cm^3$) | % of improvement per MW (g) | % of improvement per volume ($cm^3$) | Total % of improvement |
|---|---|---|---|---|---|---|---|---|
| $Ti_3SiC_2$ | 195.71 | 4.48 | 7.489 | 0.038 | 0.171 | 187.2% | 335.8% | 523.0% |
| $Ti_3AlC_2$ | 194.60 | 4.21 | 7.844 | 0.040 | 0.170 | 177.7% | 339.0% | 516.7% |
| $Ti_2SC$ | 139.81 | 4.64 | 5.655 | 0.040 | 0.187 | 177.1% | 306.7% | 483.8% |
| $V_2PC$ | 144.87 | 5.40 | 6.566 | 0.045 | 0.245 | 158.0% | 235.2% | 393.2% |

In view of Tables 6, 11, and 14, there may be several methods to protect a metal substrate, such as steel or stainless steel, especially metal components in electrochemical devices, such as in a fuel cell or electrolyzer system, which are generally made of metal substrates, from hydrogen-related degradations (e.g. hydrogen embrittlement).

In a first method, to increase the resistance of metal substrate against hydrogen-related degradations (e.g. hydrogen embrittlement), the amounts of Cr, Mo, and/or Ni in the metal substrate may be increased to achieve a target resistance capability.

In a second method, to increase the resistance of metal substrate against hydrogen-related degradations (e.g. hydrogen embrittlement), the metal substrate may include microstructures containing intermetallic compounds therewithin. The intermetallic compounds may be formed within the metal substrates by, for example, changing element compositions or through heat treatments. The metal substrate may include a surface region and a bulk region. Microstructures containing intermetallic compounds may precipitate at or near grain boundaries in the metal substrate or may segregate toward the surface region of the metal substrate or stay in the bulk region of the metal substrate. The intermetallic compounds may be, but not limited to, $Cr_3Si$, $Mn_3Si$, $SiMo_3$, $SiNi_2$, $Mn_6Si_7Ni_{16}$, MnSiNi, $Si_{12}Ni_{31}$, $Fe_3Si$, $Si_3Mo_5$, $Mn_2FeSi$, FeSi, $Mn_2CrSi$, MnSi, $MnFe_2Si$, $Si_2Mo$, $Fe_{11}Si_5$, $Fe_2Si$, $MnNi_3$, $Mn_2SiMo$, $Fe_5Si_3$, $Mn_4Si_7$, $Ni_3Mo$, $FeNi_3$, $CrSi_2$, $FeSi_2$, $Fe_2Mo$, SiNi, MnCrFeSi, $Fe_7Mo_6$, $Ni_4Mo$, FeNi, FeSiMo, $Si_2Ni$, $CrNi_3$, $SiNi_3$, or a combination thereof. Metal dopants, such as aluminum (Al), magnesium (Mg), zinc (Zn), titanium (Ti), or copper (Cu), may be added into the metal substrates to further enhance the resistance of the metal substrates against hydrogen-related degradation.

In a third method, to increase the resistance of metal substrate against hydrogen-related degradations (e.g. hydrogen embrittlement), at least one surface coating layer of a protective coating material may be applied to at least one surface (i.e. an outer surface) of the metal substrate. The protective coating material may be a carbide material. The carbide material is a carbide compound, including, but not limited to, $Ni_6Mo_6C$, $Cr_{21}Mo_2C_6$, $Mn_{23}C_6$, $Cr_{23}C_6$, $Fe_{23}C_6$, $Ni_2Mo_4C$, $Mn_3Mo_3C$, $Si_3Mo_5C$, $Fe_3Mo_3C$, $Cr_7C_3$, $Mn_7C_3$, $Mn_5SiC$, $Mn_5C_2$, $Mo_2C$, $Mn_3C$, $Cr_3C_2$, $Cr_3C$, or a combination thereof. The protective coating material may also be a MAX phase material. The MAX phase material is a MAX phase compound with a general formula of $M_{n+1}AX_n$, where n=1 to 4, M is an early transition metal, A is an A-group element (e.g. IIIA, IVA, group 13, or group 14 element), and X is either C or N. The MAX phase compound may include, but not limited to, $Nb_4AlC_3$, $Ti_4AlN_3$, $Nb_2SnC$, $Ti_3SnC_2$, $Zr_2SC$, $Ti_2SnC$, $Zr_2SnC$, $Nb_2PC$, $Nb_2AlC$, $Ti_3SiC_2$, $Ti_3AlC_2$, $Ti_2SC$, $V_2PC$, or a combination thereof. Upon disposition of a MAX phase coating material onto the at least one surface of the metal substrate, the MAX phase coating material may form stable interfaces with oxides species (e.g. chromium oxide ($Cr_{203}$), iron oxide ($Fe_2O_3$), or nickel oxide (NiO)) that are present at the surface of the metal substrate.

Still referring to the third method, metal dopants, such as Al, Mg, Zn, Ti, or Cu, may be added into the metal substrate to further enhance the resistance of the metal substrate against hydrogen-related degradations. The protective coating material may also be mixed with other conductive and anti-corrosive compounds, including, but not limited to, nitrides (e.g. chromium nitride ($CrN_x$, $0.5 \leq x \leq 2$), aluminum nitride (AlN), or titanium nitride ($TiN_x$, $0.3 \leq x \leq 2$)), carbides, and/or oxides (e.g. titanium oxide ($TiO_x$, $0.5 \leq x \leq 2$), niobium oxide ($NbO_x$, $1 \leq x \leq 3$), or magnesium titanium oxide ($MgTi_2O_{5-x}$, $0 \leq x \leq 5$)) to enhance the conductivity and/or the anti-corrosion resistance of the metal substrate. By applying a protective coating material to the metal substrate may reduce the cost of manufacturing the metal substrate.

The MAX phase compounds may be prepared via a solid-state method, a solution precipitation-based method, or a sol-gel process. Specifically, for nitride-based MAX phase compounds, solid-state precursors of $A_xB_yO_z$ (A and B are metal elements) may be treated with $N_2$, $NH_3$, or both, at temperatures varying from about 250 to 2,000° C. to yield a ternary nitride compound, $A_xB_yN_z$. For carbide-based MAX phase compounds, metal elements or metal hydrides may be mixed with carbon powders. The resulting powders may be pelletized and heat-treated at temperatures varying from about 400 to 2,000° C. to yield a ternary carbide compound $A_xB_yC_z$. For the solution precipitation-based method, two different metallic complexes (e.g. metal chlorides, metal nitrates, or metal sulfates) may be dissolved in a solvent (e.g. water, acetonitrile, acetone, ethanol, or isopropyl alcohol), followed by adding another chemical molecule, such as ethanolamine, to the reaction mixture to yield a precipitate. The resulting reaction mixture may be filtered and dried and heated in a reducing environment (e.g. under $N_2$ or $NH_3$) to afford a ternary MAX phase compound. For the sol-gel process, metal alkoxides may be used as a precursor to prepare a MAX phase compounds.

To deposit a protective coating layer of a MAX phase material to the at least one surface of the metal substrate, several techniques may be employed. For example, physical vapor deposition (PVD) is one of the most widely used techniques for the deposition of MAX phase thin films onto a substrate, including a metal substrate. Depending on the composition of a MAX phase compound, different variations of PVD, including magnetron sputtering, high-power impulse magnetron sputtering (HiPIMS), or pulsed laser deposition, may be used. Temperatures varying from about 400° C. to 1,100° C. may be required for the deposition. In addition, chemical vapor deposition techniques (CVD), such as atomic layer deposition, plasma-enhanced CVD or laser CVD, may also be used to deposit MAX phase thin films onto the substrate. Further, electrospun precursor fibers containing target metals may be thermally treated, where the addition of organic molecules, such as methylated polyuria, may help control the morphology of the defined fibers. Viscous solutions including the target metals may be dried into a glass or glassy film, and a processing step, such as spray coating, spinning, printing, or templating, can be used to deposit the precursor onto the substrate.

An interfacial contact resistance between a protective coating layer and a metal substrate may be less than 50 Ohm $cm^2$, and in other embodiments, less than 0.01 Ohm $cm^2$ during a normal operation of an electrochemical device. An electrical conductivity value of the protective coating layer may be at least 0.1 S $cm^{-1}$, and in other embodiments, greater than 100 S $cm^{-1}$. Each protective coating layer may have a thickness of 5 nm to 1 mm, typically in a range of 50 nm and 500 μm, depending on a target conductivity.

Next, exemplary embodiments will be discussed in a fuel cell system. It is noted that the protection methods applied to the fuel cell system as described herein may also be applicable to metal components in other electrochemical devices, such as metal components in an electrolyzer system.

Figure 5A:
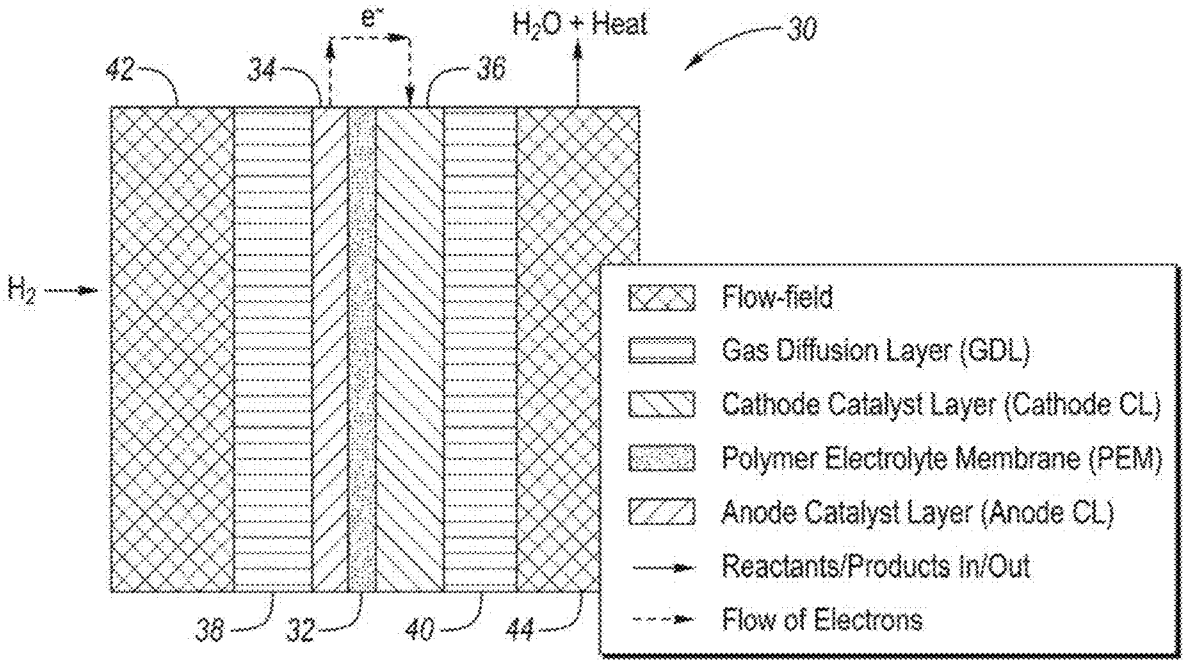
FIG. 5A is a schematic cross-sectional view of a fuel cell.
Figure 5B:
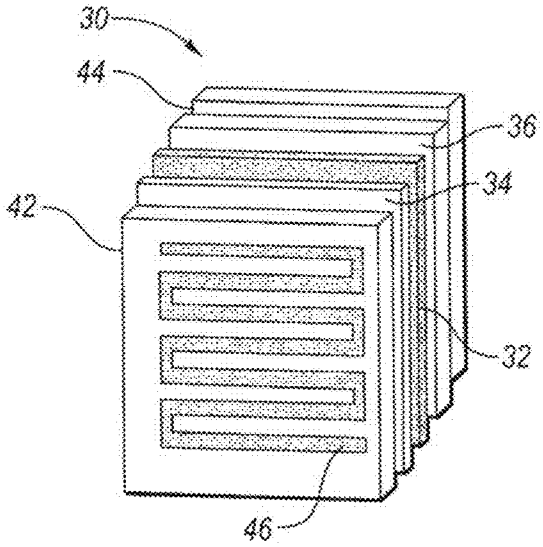
FIG. 5B is a schematic perspective view of components of the fuel cell shown in FIG. 5A.

FIG. 5A is a schematic cross-sectional view of a fuel cell. FIG. 5B is a schematic perspective view of components of the fuel cell shown in FIG. 5A. FIG. 5A also generally depicts the reactants and products of the operation of the fuel cell. The fuel cell 30 may be a proton-exchange membrane (PEM) fuel cell. As shown in FIG. 5A, the fuel cell 30 includes a PEM 32, a first catalyst layer 34 and a second catalyst layer 36. The PEM 32 is situated between the first and second catalyst layers, 34 and 36. The fuel cell 30 further includes a first gas diffusion layer (GDL) 38 surrounds the first catalyst layer 34, and a second GDL 40 surrounds the second catalyst layer 36. The fuel cell 30 also includes a first bipolar plate 42 and a second bipolar plate 44. The first and second bipolar plates, 42 and 44, are positioned at opposite ends of the fuel cell 30 and surround the first and second GDLs, 38 and 40, respectively. The first and second bipolar plates, 42 and 44, are typically formed of a metal substrate, such as steel or stainless steel, and have at least one surface.

The first and second bipolar plates, 42 and 44, may provide structural support and conductivity, and may assist in supplying fuel and oxidants (air) in the fuel cell 30. The first and second bipolar plates, 42 and 44, may also assist in removal of reaction products or byproducts from the fuel cell 30. As shown in FIG. 5B, the first bipolar plate 42 includes a flow passage 46. The second bipolar plate 44 also includes a flow passage (not shown). The flow passages are configured to assist in supplying fuel and/or removing by-products in the fuel cell 30.

Apart from the components within the fuel cell 30, to properly function, the fuel cell 30 is connected to other components in the fuel cell system. These other components may include, but not limited to, fuel storage tanks, connecting pipes, safety valves, condensers, or heat exchangers. These other components, like bipolar plates, may also be made of metal-based materials, such as steel or stainless steel, and may also be exposed to $H_2$ gas and subjected to hydrogen-related degradations (e.g. hydrogen embrittlement). Therefore, to maintain a healthy environment in the fuel cell system and extend the durability of the fuel cell, these other components as well as bipolar plates are needed to be protected from potential hydrogen-related degradations.

In one embodiment, to protect the component in the fuel cell system from hydrogen-related degradations (e.g. hydrogen embrittlement), the component may be made of a metal substrate (e.g. steel or stainless steel) having a high amount of Cr, Mo, and/or Ni elements.

In another embodiment, to protect the component in the fuel cell system from hydrogen-related degradations (e.g. hydrogen embrittlement), the component made of stainless steel may include microstructures containing intermetallic compounds therewithin. The intermetallic compounds may be formed within the component by, for example, changing element compositions or through heat treatments. The component may include a surface region and a bulk region. Microstructures containing intermetallic compounds may precipitate at or near grain boundaries in the component or may segregate toward the surface region of the component or stay in the bulk region of the component. The intermetallic compounds may be, but not limited to, $Cr_3Si$, $Mn_3Si$, $SiMo_3$, $SiNi_2$, $Mn_6Si_7Ni_{16}$, MnSiNi, $Si_{12}Ni_{31}$, $Fe_3Si$, $Si_3Mo_5$, $Mn_2FeSi$, FeSi, $Mn_2CrSi$, MnSi, $MnFe_2Si$, $Si_2Mo$, $Fe_{11}Si_5$, $Fe_2Si$, $MnNi_3$, $Mn_2SiMo$, $Fe_5Si_3$, $Mn_4Si_7$, $Ni_3Mo$, $FeNi_3$, $CrSi_2$, $FeSi_2$, $Fe_2Mo$, SiNi, MnCrFeSi, $Fe_7Mo_6$, $Ni_4Mo$, FeNi, FeSiMo, $Si_2Ni$, $CrNi_3$, $SiNi_3$, or a combination thereof. Metal dopants, such as Al, Mg, Zn, Ti, or Cu, may be added into the component to further enhance the resistance of the component against hydrogen-related degradations.

In yet another embodiment, to protect the component in the fuel cell system from hydrogen-related degradations (e.g. hydrogen embrittlement), at least one surface coating layer of a protecting coating material may be applied to at least one surface of the component. The protective coating material may be a carbide material. The carbide material is a carbide compound, including, but not limited to, $Ni_6Mo_6C$, $Cr_{21}Mo_2C_6$, $Mn_{23}C_6$, $Cr_{23}C_6$, $Fe_{23}C_6$, $Ni_2Mo_4C$, $Mn_3Mo_3C$, $Si_3Mo_5C$, $Fe_3Mo_3C$, $Cr_7C_3$, $Mn_7C_3$, $Mn_5SiC$, $Mn_5C_2$, $Mo_2C$, $Mn_3C$, $Cr_3C_2$, $Cr_3C$, or a combination thereof. The protective coating material may also be a MAX phase material. The MAX phase material is a MAX phase compound with a general formula of $M_{n+1}AX_n$, where n=1 to 4, M is an early transition metal, A is an A-group element (e.g. IIIA, IVA, group 13, or group 14 element), and X is either C or N. The MAX phase compound may include, but not limited to, $Nb_4AlC_3$, $Ti_4AlN_3$, $Nb_2SnC$, $Ti_3SnC_2$, $Zr_2SC$, $Ti_2SnC$, $Zr_2SnC$, $Nb_2PC$, $Nb_2AlC$, $Ti_3SiC_2$, $Ti_3AlC_2$, $Ti_2SC$, $V_2PC$, or a combination thereof. Metal dopants, such as Al, Mg, Zn, Ti, or Cu, may be added into the component to further enhance the resistance of the component against hydrogen-related degradations. The protective coating material may also be mixed with other conductive and anti-corrosive compounds, including, but not limited to, nitrides (e.g. chromium nitride ($CrN_x$, $0.5 \le x \le 2$), aluminum nitride (AlN), or titanium nitride ($TiN_x$, $0.3 \le x \le 2$)), carbides, and/or oxides (e.g. titanium oxide ($TiO_x$, $0.5 \le x \le 2$), niobium oxide ($NbO_x$, $1 \le x \le 3$), or magnesium titanium oxide ($MgTi_2O_{5-x}$, $0 \le x \le 5$)) to enhance the conductivity and/or anti-corrosion resistance of the component. By applying a protective coating material to the at least one surface of the component may reduce the cost of manufacturing the component.

In some other embodiments, when more than one surface coating layer of the protecting coating material are applied to one surface of the component, each surface coating layer may include a different coating material to achieve a total targeting resistance capability. For example, one of the surface coating layers has a first carbide material including a first carbide compound, and another one of the surface coating layers has a second carbide material including a second carbide compound different from the first carbide compound.

In still yet another embodiment, to protect the component in the fuel cell system from hydrogen-related degradations (e.g. hydrogen embrittlement), the component made of stainless steel may not only include microstructures containing intermetallic compounds, but also at least one surface coating layer of a protecting coating material may be applied to at least one surface of the component. Specifically, on the one hand, the intermetallic compounds may be formed within the component by, for example, changing element compositions or through heat treatments. The component may include a surface region and a bulk region. Microstructures containing intermetallic compounds may precipitate at or near grain boundaries in the component or may segregate toward the surface region of the component or stay in the bulk region of the component. The intermetallic compounds may be, but not limited to, $Cr_3Si$, $Mn_3Si$, $SiMo_3$, $SiNi_2$, $Mn_6Si_7Ni_{16}$, MnSiNi, $Si_{12}Ni_{31}$, $Fe_3Si$, $Si_3Mo_5$, $Mn_2FeSi$, FeSi, $Mn_2CrSi$, MnSi, $MnFe_2Si$, $Si_2Mo$, $Fe_{11}Si_5$, $Fe_2Si$, $MnNi_3$, $Mn_2SiMo$, $Fe_5Si_3$, $Mn_4Si_7$, $Ni_3Mo$, $FeNi_3$, $CrSi_2$, $FeSi_2$, $Fe_2Mo$, SiNi, MnCrFeSi, $Fe_7Mo_6$, $Ni_4Mo$, FeNi, FeSiMo, $Si_2Ni$, $CrNi_3$, $SiNi_3$, or a combination thereof. On the other hand, the protective coating material applied to the at least one surface of the component may be a carbide material. The carbide material is a carbide compound, including, but not limited to, $Ni_6Mo_6C$, $Cr_{21}Mo_2C_6$, $Mn_{23}C_6$, $Cr_{23}C_6$, $Fe_{23}C_6$, $Ni_2Mo_4C$, $Mn_3Mo_3C$, $Si_3Mo_5C$, $Fe_3Mo_3C$, $Cr_7C_3$, $Mn_7C_3$, $Mn_5SiC$, $Mn_5C_2$, $Mo_2C$, $Mn_3C$, $Cr_3C_2$, $Cr_3C$, or a combination thereof. The protective coating material may also be a MAX phase material. The MAX phase material is a MAX phase compound with a general formula of $M_{n+1}AX_n$, where n=1 to 4, M is an early transition metal, A is an A-group element (e.g. IIIA, IVA, group 13, or group 14 element), and X is either C or N. The MAX phase compound may include, but not limited to, $Nb_4AlC_3$, $Ti_4AlN_3$, $Nb_2SnC$, $Ti_3SnC_2$, $Zr_2SC$, $Ti_2SnC$, $Zr_2SnC$, $Nb_2PC$, $Nb_2AlC$, $Ti_3SiC_2$, $Ti_3AlC_2$, $Ti_2SC$, $V_2PC$, or a combination thereof.

Still referring to this embodiment, metal dopants, such as Al, Mg, Zn, Ti, or Cu, may be added into the component to further enhance the resistance of the component against hydrogen-related degradations. The protective coating material may also be mixed with other conductive and anti-corrosive compounds, including, but not limited to, nitrides (e.g. chromium nitride ($CrN_x$, $0.5 \le x \le 2$), aluminum nitride (AlN), or titanium nitride ($TiN_x$, $0.3 \le x \le 2$)), carbides, and/or oxides (e.g. titanium oxide ($TiO_x$, $0.5 \le x \le 2$), niobium oxide ($NbO_x$, $1 \le x \le 3$), or magnesium titanium oxide ($MgTi_2O_{5-x}$, $0 \le x \le 5$)) to enhance the conductivity and/or the anti-corrosion resistance of the bipolar plates.

In addition, an interfacial contact resistance between a protective coating layer and the component in the fuel cell system may be less than 50 Ohm $cm^2$, and in other embodiments, less than 0.01 Ohm $cm^2$ during an operation of the fuel cell. An electrical conductivity value of a protective coating layer may be at least 0.1 S $cm^{-1}$, and in some embodiments, greater than 100 S $cm^{-1}$. Each protective coating layer may have a thickness of 5 nm to 1 mm, typically in a range of 50 nm and 500 μm, depending on a target conductivity.

Apart from compositions, the property of the protective coating material may also vary depending on other factors such as, defects, off-stoichiometries, microstructure or morphology (e.g. local grain boundaries, cracks, or flake sizes), and crystallinity (e.g. crystalline verse amorphous structure) of the protective coating material. A lattice mismatch between the protecting coating material and a bipolar plate may also have an impact on the local structure and/or electronic structure of the bipolar plate.

It is noted that a component made of metal substrates in an electrochemical device, such as in a fuel cell or electrolyzer system, when exposed to $H_2$, may not immediately react with $H_2$. Therefore, a H atom or $H_2$ sitting at a defect site, a crack, or a grain boundary of the component may consequently lead to a significant metal embrittlement of the metal substrates.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A component of an electrochemical device comprising:

a substrate made of stainless steel and having at least one surface; and at least one surface coating layer on each of the at least one surface, each of the at least one surface coating layer including a carbide material, the carbide material being a carbide compound, and the carbide compound being $Ni_6Mo_6C$, $Cr_{21}Mo_2C_6$, $Ni_2Mo_4C$, $Mn_3Mo_3C$, $Si_3Mo_5C$, $Mn_7C_3$, $Mn_5SiC$, or a combination thereof, wherein one of the at least one surface coating layer has a first carbide material including a first carbide compound, and another one of the at least one surface coating layer has a second carbide material including a second carbide compound different from the first carbide compound.

2. The component of claim 1, wherein the carbide material is doped with at least one metal element, and the at least one metal element is Al, Mg, Zn, Ti, or Cu.

3. The component of claim 1, wherein the carbide material is mixed with a nitride compound and/or an oxide compound.

4. The component of claim 3, wherein the oxide compound is a niobium oxide ($NbO_x$, $1 \le x \le 3$) or a magnesium titanium oxide ($MgTi_2O_{5-x}$, $0 \le x \le 5$).

5. The component of claim 1, wherein an interfacial contact resistance between the at least one surface coating layer and the substrate is less than 50 Ohm $cm^2$.

6. The component of claim 1, wherein an electrical conductivity of the at least one surface coating layer is at least 0.1 S $cm^{-1}$.

7. The component of claim 1, wherein each of the at least one surface coating layer has a thickness of 5 nm to 1 mm.

* * * * *